United States Patent
Wang et al.

(10) Patent No.: US 12,342,297 B2
(45) Date of Patent: Jun. 24, 2025

(54) TIMING ADJUSTMENT IN SIDELINK

(71) Applicant: QUALCOMM Incorporated, San Diego, CA (US)

(72) Inventors: Hua Wang, Basking Ridge, NJ (US); Sony Akkarakaran, Poway, CA (US); Kapil Gulati, Belle Mead, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

(21) Appl. No.: 17/401,943

(22) Filed: Aug. 13, 2021

(65) Prior Publication Data

US 2022/0061003 A1 Feb. 24, 2022

Related U.S. Application Data

(60) Provisional application No. 63/067,959, filed on Aug. 20, 2020.

(51) Int. Cl.
*H04W 56/00* (2009.01)
*H04L 5/00* (2006.01)
*H04W 72/56* (2023.01)

(52) U.S. Cl.
CPC ......... *H04W 56/001* (2013.01); *H04L 5/0048* (2013.01); *H04W 72/56* (2023.01)

(58) Field of Classification Search
None
See application file for complete search history.

(56) References Cited

U.S. PATENT DOCUMENTS

| | | | | |
|---|---|---|---|---|
| 8,112,694 B1* | 2/2012 | Woo | ...................... | H04L 1/1848 |
| | | | | 714/751 |
| 2004/0255001 A1* | 12/2004 | Oh | ..................... | H04W 56/0015 |
| | | | | 709/248 |
| 2011/0275382 A1* | 11/2011 | Hakola | ................. | H04W 24/10 |
| | | | | 455/452.2 |
| 2012/0302254 A1* | 11/2012 | Charbit | ................. | H04W 64/00 |
| | | | | 455/456.1 |
| 2014/0293968 A1* | 10/2014 | Ebrahimi Tazeh Mahalleh | .......... | |
| | | | | H04W 56/001 |
| | | | | 370/336 |
| 2015/0009949 A1* | 1/2015 | Khoryaev | ............. | H04W 88/02 |
| | | | | 370/329 |
| 2016/0337992 A1* | 11/2016 | Sheu | ................... | H04W 56/001 |

(Continued)

*Primary Examiner* — Ayman A Abaza
*Assistant Examiner* — Camquyen Thai
(74) *Attorney, Agent, or Firm* — Muncy, Geissler, Olds & Lowe, P.C.

(57) ABSTRACT

Disclosed are techniques for wireless communication. In an aspect, a receiver user equipment (UE) receives, from a transmitter UE, a sidelink reference signal over a sidelink established with the transmitter UE, and transmits a sidelink timing adjust (TA) command to the transmitter UE based on the sidelink reference signal, the sidelink TA command requesting the transmitter UE to adjust a sidelink transmit time of the transmitter UE. In an aspect, a transmitter UE transmits, to a receiver UE, a sidelink reference signal over a sidelink established with the receiver UE, and receives a first sidelink TA command from the receiver UE based on the sidelink reference signal, the sidelink TA command requesting the transmitter UE to adjust a sidelink transmit time of the transmitter UE.

26 Claims, 12 Drawing Sheets

(56) References Cited

U.S. PATENT DOCUMENTS

| | | | |
|---|---|---|---|
| 2016/0381694 A1* | 12/2016 | Yano | H04W 72/56 |
| | | | 370/329 |
| 2018/0049129 A1* | 2/2018 | Li | H04W 52/0235 |
| 2018/0139002 A1* | 5/2018 | Blasco Serrano | H04J 3/0658 |
| 2019/0053228 A1* | 2/2019 | Akkarakaran | H04W 72/0446 |
| 2019/0159149 A1* | 5/2019 | Ryu | H04W 56/0045 |
| 2019/0159155 A1* | 5/2019 | Abedini | H04W 56/0045 |
| 2019/0261298 A1* | 8/2019 | Yoon | H04L 5/0053 |
| 2020/0053607 A1* | 2/2020 | Ingale | H04W 36/0058 |
| 2021/0051614 A1 | 2/2021 | Gulati et al. | |
| 2021/0266849 A1* | 8/2021 | Uchino | H04W 56/001 |
| 2021/0377893 A1* | 12/2021 | Khoryaev | H04L 5/0053 |
| 2022/0046574 A1* | 2/2022 | Farag | H04L 27/2607 |

\* cited by examiner

TIMING ADJUSTMENT IN SIDELINK

CROSS-REFERENCE TO RELATED APPLICATIONS

The present application for patent claims the benefit of U.S. Provisional Application No. 63/067,959, entitled "TIMING ADJUSTMENT IN SIDELINK," filed Aug. 20, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for wireless communication performed by a receiver user equipment (UE) includes receiving, from a first transmitter UE, a first sidelink reference signal over a first sidelink established with the first transmitter UE; and transmitting a first sidelink timing adjust (TA) command to the first transmitter UE based on the first sidelink reference signal, the first sidelink TA command requesting the first transmitter UE to adjust a sidelink transmit time of the first transmitter UE.

In an aspect, a method for wireless communication performed by a transmitter user equipment (UE) includes transmitting, to a first receiver UE, a first sidelink reference signal over a first sidelink established with the first receiver UE; and receiving a first sidelink timing adjust (TA) command from the first receiver UE based on the first sidelink reference signal, the first sidelink TA command requesting the transmitter UE to adjust a sidelink transmit time of the transmitter UE.

In an aspect, a receiver user equipment (UE) includes a memory; at least one transceiver; and at least one processor communicatively coupled to the memory and the at least one transceiver, the at least one processor configured to: receive, via the at least one transceiver, from a first transmitter UE, a first sidelink reference signal over a first sidelink established with the first transmitter UE; and transmit, via the at least one transceiver, a first sidelink timing adjust (TA) command to the first transmitter UE based on the first sidelink reference signal, the first sidelink TA command requesting the first transmitter UE to adjust a sidelink transmit time of the first transmitter UE.

In an aspect, a transmitter user equipment (UE) includes a memory; at least one transceiver; and at least one processor communicatively coupled to the memory and the at least one transceiver, the at least one processor configured to: transmit, via the at least one transceiver, to a first receiver UE, a first sidelink reference signal over a first sidelink established with the first receiver UE; and receive, via the at least one transceiver, a first sidelink timing adjust (TA) command from the first receiver UE based on the first sidelink reference signal, the first sidelink TA command requesting the transmitter UE to adjust a sidelink transmit time of the transmitter UE.

In an aspect, a receiver user equipment (UE) includes means for receiving, from a first transmitter UE, a first sidelink reference signal over a first sidelink established with the first transmitter UE; and means for transmitting a first sidelink timing adjust (TA) command to the first transmitter UE based on the first sidelink reference signal, the first sidelink TA command requesting the first transmitter UE to adjust a sidelink transmit time of the first transmitter UE.

In an aspect, a transmitter user equipment (UE) includes means for transmitting, to a first receiver UE, a first sidelink reference signal over a first sidelink established with the first receiver UE; and means for receiving a first sidelink timing adjust (TA) command from the first receiver UE based on the first sidelink reference signal, the first sidelink TA command requesting the transmitter UE to adjust a sidelink transmit time of the transmitter UE.

In an aspect, a non-transitory computer-readable medium stores computer-executable instructions that, when executed by a receiver user equipment (UE), cause the receiver UE to: receive, from a first transmitter UE, a first sidelink reference signal over a first sidelink established with the first transmitter UE; and transmit a first sidelink timing adjust (TA) command to the first transmitter UE based on the first sidelink reference signal, the first sidelink TA command requesting the first transmitter UE to adjust a sidelink transmit time of the first transmitter UE.

In an aspect, a non-transitory computer-readable medium stores computer-executable instructions that, when executed by a transmitter user equipment (UE), cause the transmitter UE to: transmit, to a first receiver UE, a first sidelink reference signal over a first sidelink established with the first receiver UE; and receive a first sidelink timing adjust (TA) command from the first receiver UE based on the first sidelink reference signal, the first sidelink TA command requesting the transmitter UE to adjust a sidelink transmit time of the transmitter UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
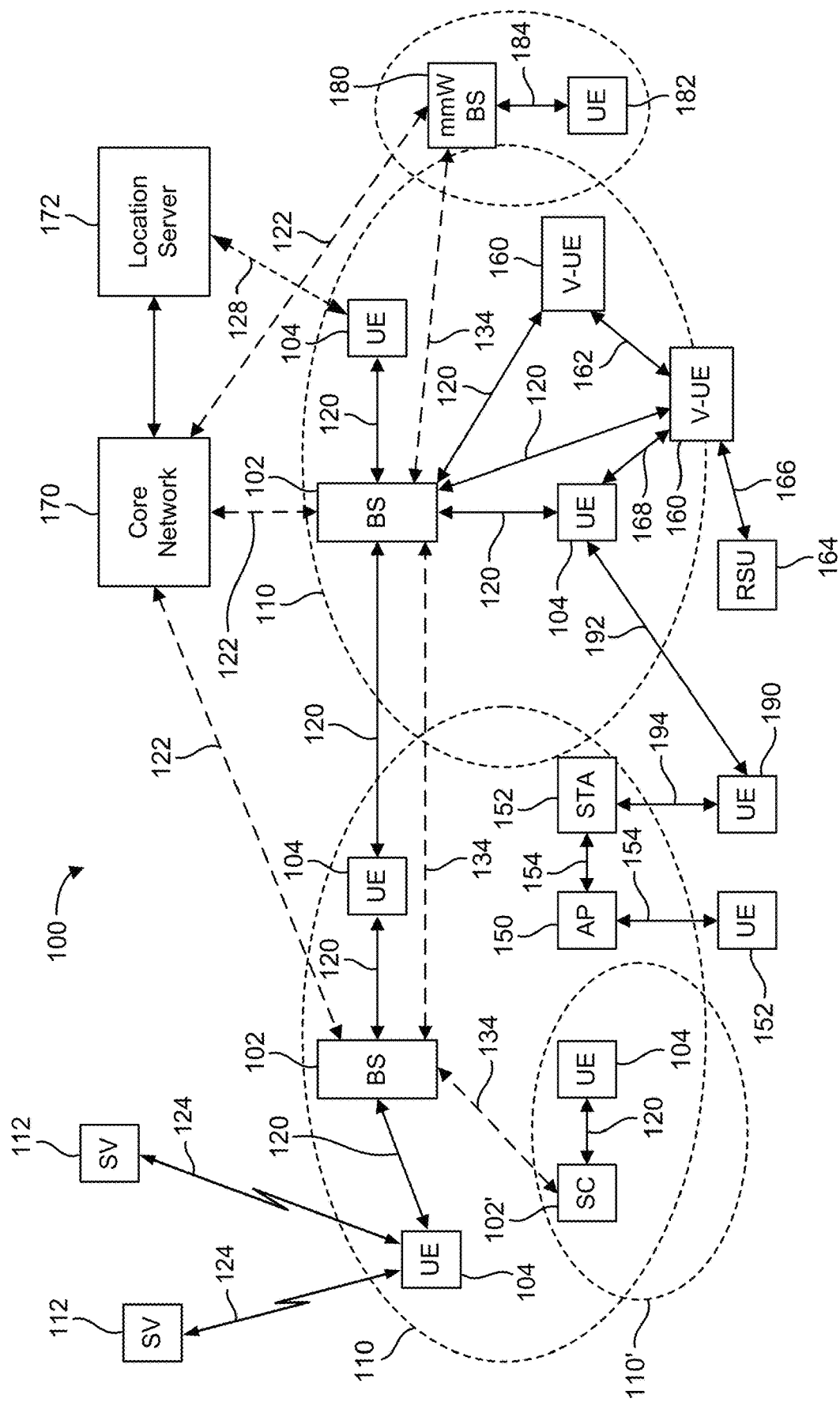
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration."

Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
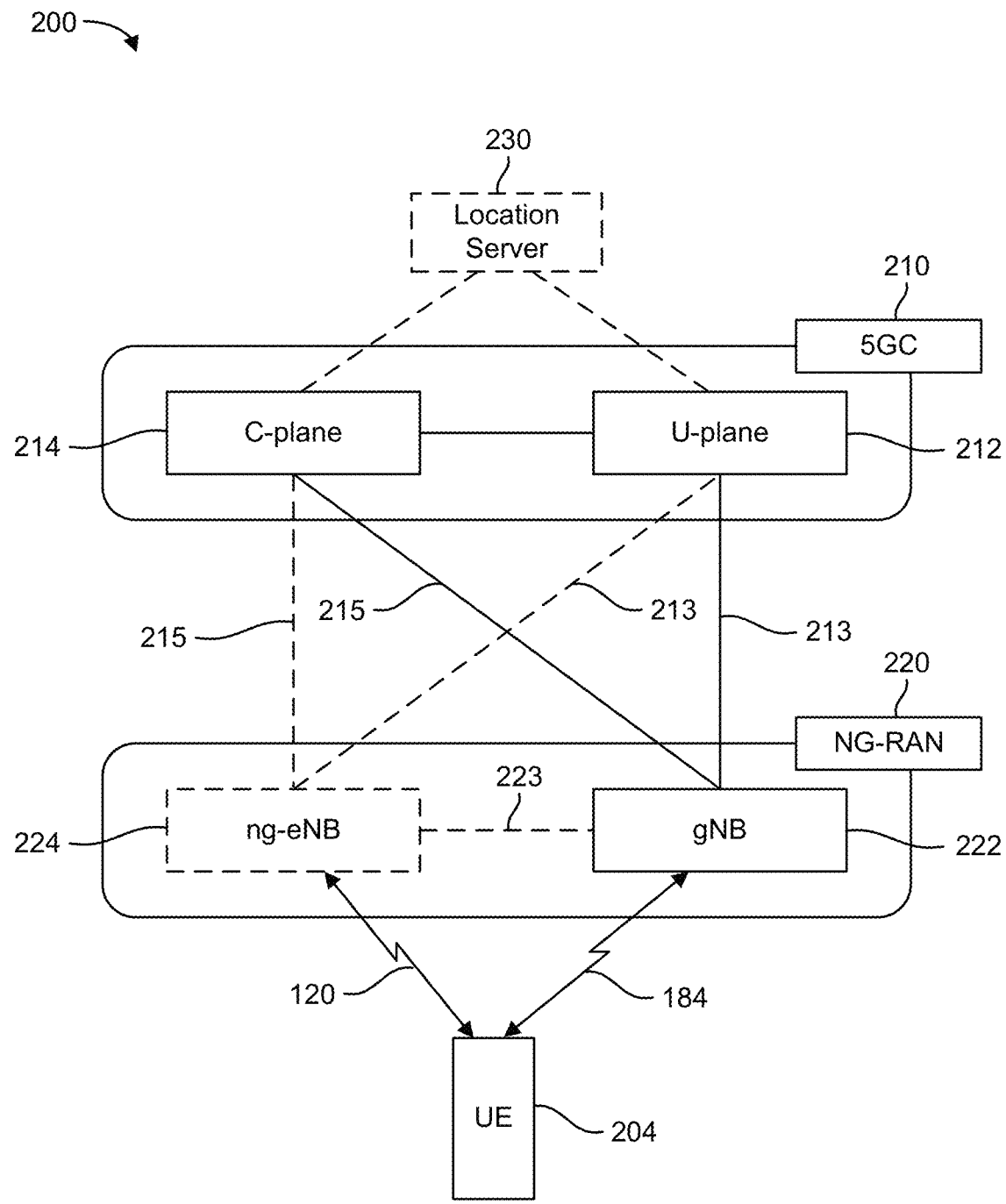
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
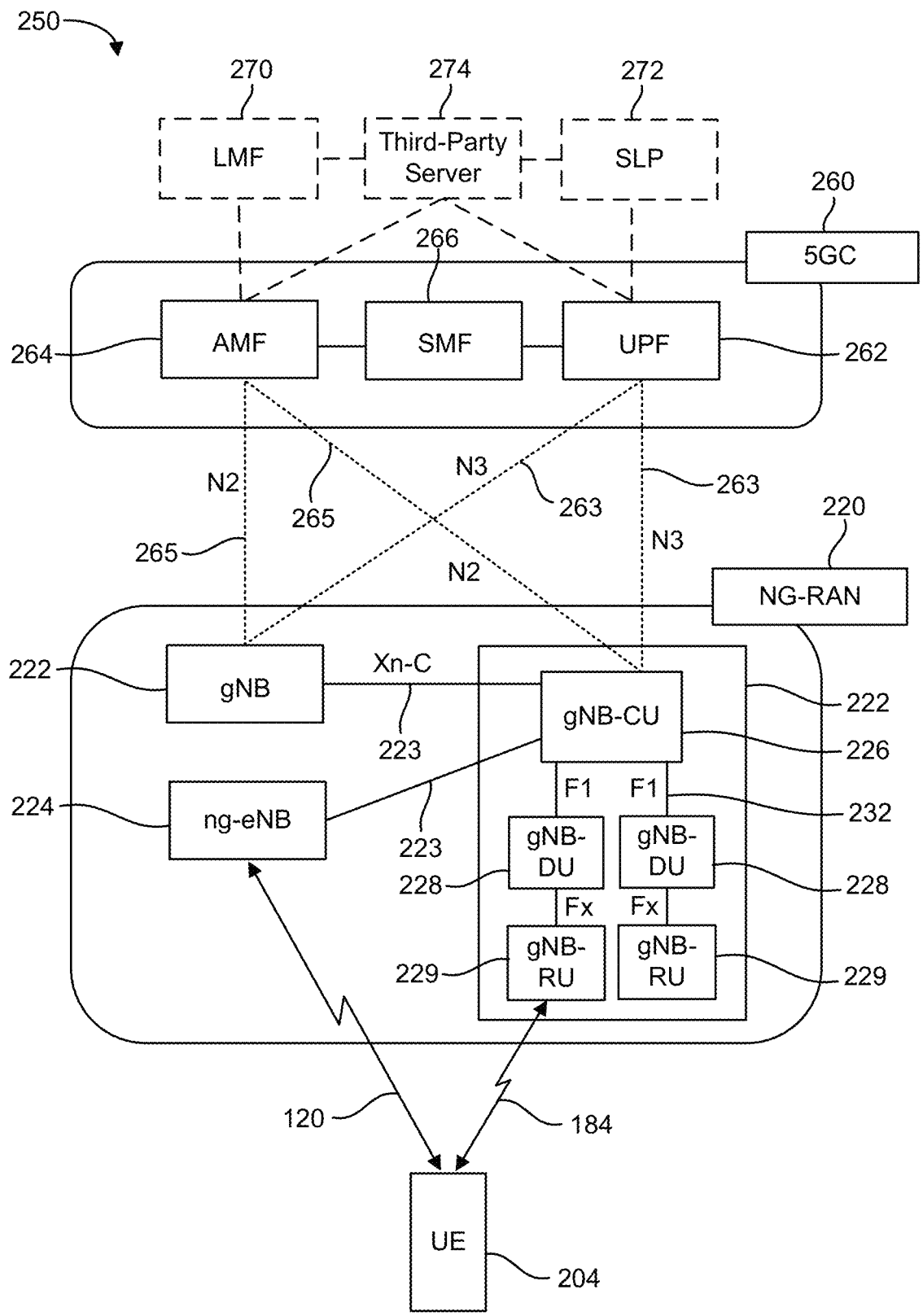

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3:
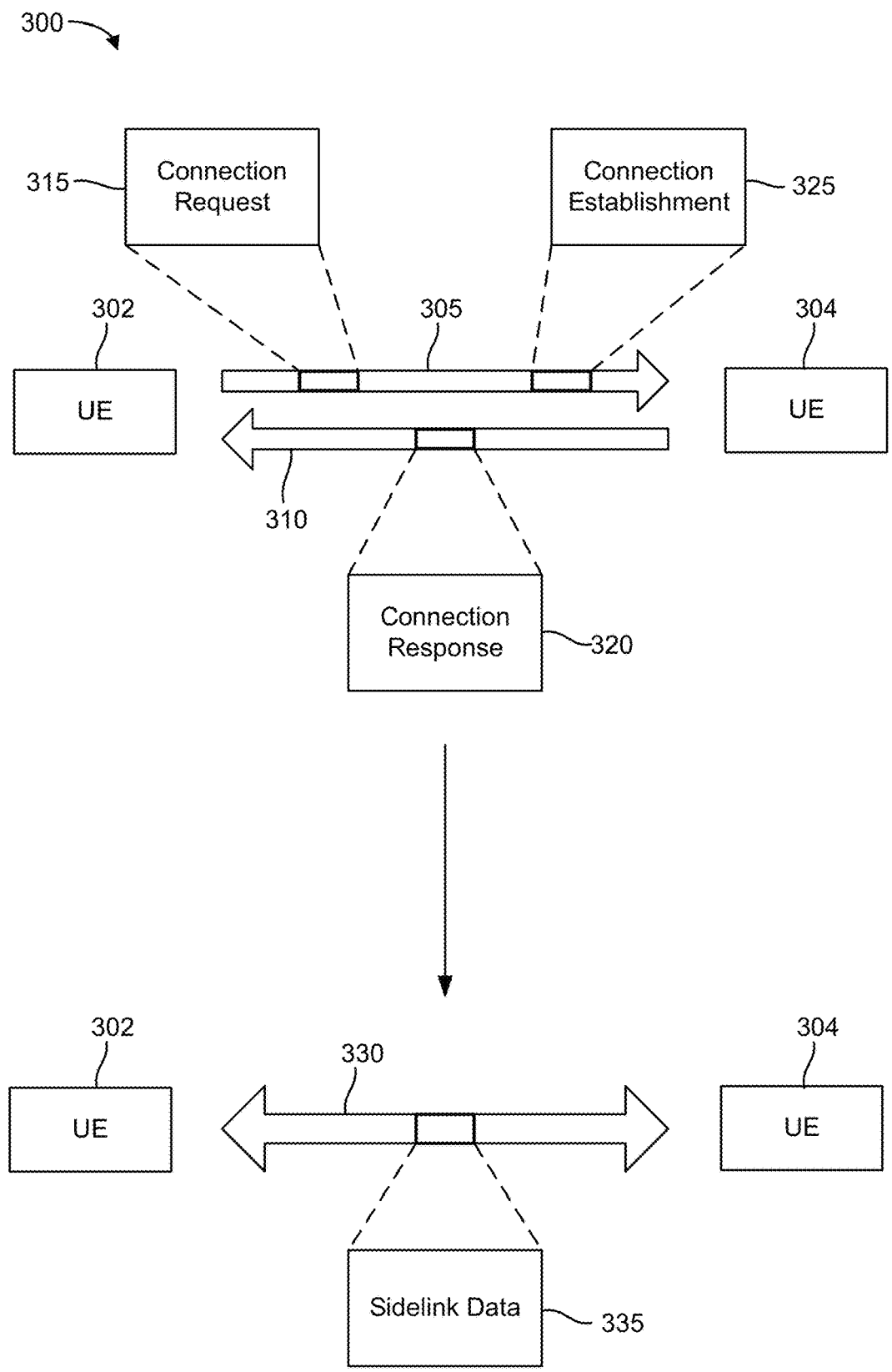
FIG. 3 illustrates an example of a wireless communications system that supports unicast sidelink establishment, according to aspects of the disclosure.

FIG. 3 illustrates an example of a wireless communications system 300 that supports wireless unicast sidelink establishment, according to aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As specific examples, UEs 302 and 304 may correspond to V-UEs 160 in FIG. 1.

In the example of FIG. 3, the UE 302 may attempt to establish a unicast connection over a sidelink with the UE 304, which may be a V2X sidelink between the UE 302 and UE 304. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 302 may be referred to as an initiating UE that initiates the sidelink connection procedure, and the UE 304 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 302 and UE 304. For example, a transmission and reception capability matching may be negotiated between the UE 302 and UE 304. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the sidelink connection establishment. Conventionally, UE 302 may identify and locate candidates for sidelink communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in an NR sidelink broadcast). In some cases, the UE 304 may include one or more parameters for itself in the service announcement, including connection parameters and/or capabilities it possesses. The UE 302 may then monitor for and receive the broadcasted service announcement to identify potential UEs for corresponding sidelink connections. In some cases, the UE 302 may identify the potential UEs based on the capabilities each UE indicates in their respective service announcements.

The service announcement may include information to assist the UE 302 (e.g., or any initiating UE) to identify the UE transmitting the service announcement (UE 304 in the example of FIG. 3). For example, the service announcement may include channel information where direct communication requests may be sent. In some cases, the channel information may be RAT-specific (e.g., specific to LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 304 in the example of FIG. 3), the initiating UE (UE 302 in the example of FIG. 3) may transmit a connection request 315 to the identified target UE 304. In some cases, the connection request 315 may be a first RRC message transmitted by the UE 302 to request a unicast connection with the UE 304 (e.g., an "RRCSetupRequest" message). For example, the unicast connection may utilize the PC5 interface for the sidelink, and the connection request 315 may be an RRC connection setup request message. Additionally, the UE 302 may use a sidelink signaling radio bearer 305 to transport the connection request 315.

After receiving the connection request 315, the UE 304 may determine whether to accept or reject the connection request 315. The UE 304 may base this determination on a transmission/reception capability, an ability to accommodate the unicast connection over the sidelink, a particular service indicated for the unicast connection, the contents to be transmitted over the unicast connection, or a combination thereof. For example, if the UE 302 wants to use a first RAT to transmit or receive data, but the UE 304 does not support the first RAT, then the UE 304 may reject the connection request 315. Additionally or alternatively, the UE 304 may reject the connection request 315 based on being unable to accommodate the unicast connection over the sidelink due to limited radio resources, a scheduling issue, etc. Accordingly, the UE 304 may transmit an indication of whether the request is accepted or rejected in a connection response 320. Similar to the UE 302 and the connection request 315, the UE 304 may use a sidelink signaling radio bearer 310 to transport the connection response 320. Additionally, the connection response 320 may be a second RRC message transmitted by the UE 304 in response to the connection request 315 (e.g., an "RRCResponse" message).

In some cases, sidelink signaling radio bearers 305 and 310 may be the same sidelink signaling radio bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that the UE 304 accepted the connection request 315, the UE 302 may then transmit a connection establishment 325 message on the sidelink signaling radio bearer 305 to indicate that the unicast connection setup is complete. In some cases, the connection establishment 325 may be a third RRC message (e.g., an "RRCSetupComplete" message). Each of the connection request 315, the connection response 320, and the connection establishment 325 may use a basic capability when being transported from one UE to the other UE to enable each UE to be able to receive and decode the corresponding transmission (e.g., the RRC messages).

Additionally, identifiers may be used for each of the connection request 315, the connection response 320, and the connection establishment 325. For example, the identifiers may indicate which UE 302/304 is transmitting which message and/or for which UE 302/304 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, the UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 302 and/or UE 304 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between the UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1. In some cases, the sidelink data 335 may include RRC messages transmitted between the two UEs 302 and 304. To maintain this unicast connection on sidelink 330, UE 302 and/or UE 304 may transmit a keep alive message (e.g., "RRCLinkAlive" message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
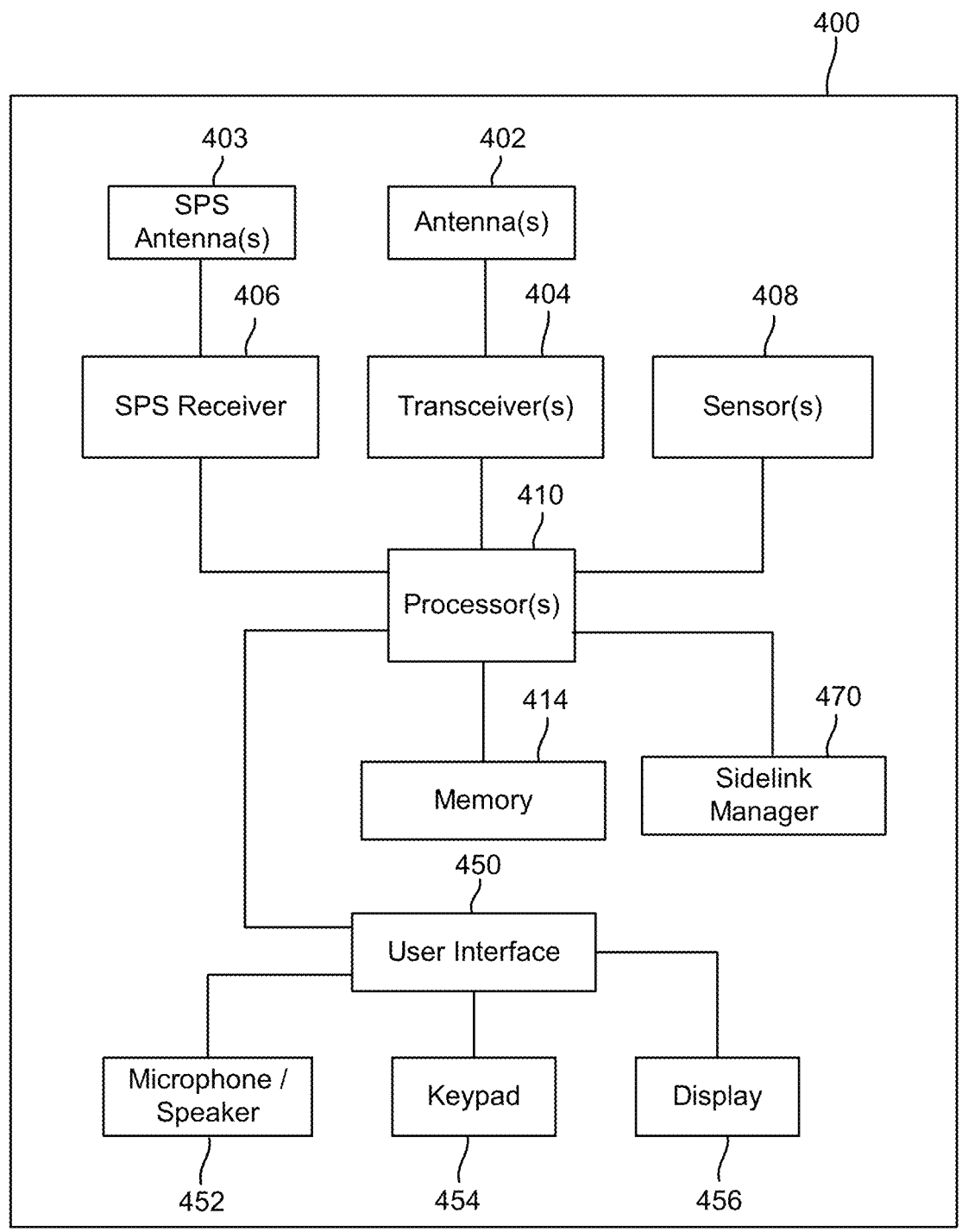
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include one or more transceivers 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The one or more transceivers 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the one or more transceivers 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning system (SPS) receiver 406. The SPS receiver 406 may be connected to the one or more SPS antennas 403 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to one or more processors 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The one or more processors 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The one or more processors 410 may therefore provide means for processing, such as means for determining, means for calculating, means for receiving, means for transmitting, means for indicating, etc. The one or more processors 410 may include any form of logic suitable for performing, or causing the components of the UE 400 to perform, at least the techniques described herein.

The one or more processors 410 may also be coupled to a memory 414 providing means for storing (including means for retrieving, means for maintaining, etc.) data and software instructions for executing programmed functionality within the UE 400. The memory 414 may be on-board the one or more processors 410 (e.g., within the same integrated circuit (IC) package), and/or the memory 414 may be external to the one or more processors 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the one or more processors 410. The sidelink manager 470 may be a hardware, software, or firmware component that, when executed, causes the UE 400 to perform the operations described herein. For example, the sidelink manager 470 may be a software module stored in memory 414 and executable by the one or more processors 410. As another example, the sidelink manager 470 may be a hardware circuit (e.g., an ASIC, a field-programmable gate array (FPGA), etc.) within the UE 400.

Figure 5:
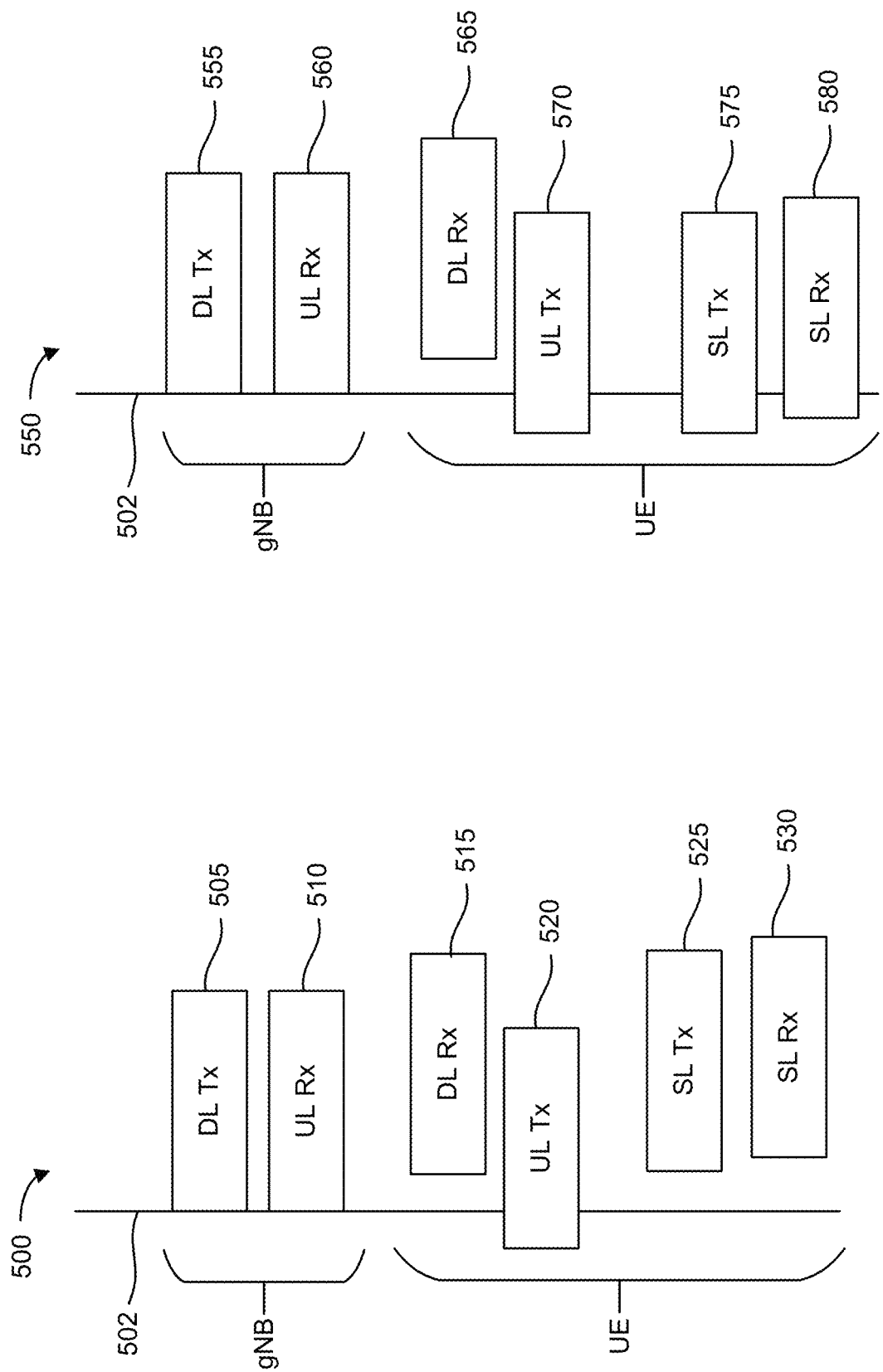
FIG. 5 illustrates a comparison between downlink timing and uplink timing for sidelink communication.

In NR, a UE configured for sidelink communication uses its downlink timing for all sidelink channels. In LTE, however, a UE uses its uplink timing for at least the physical sidelink shared channel (PSSCH) in mode "1." FIG. 5 illustrates a comparison between downlink timing and uplink timing for sidelink communication. Specifically, diagram 500 illustrates a downlink timing example and diagram 550 illustrates an uplink timing example. The vertical line in each diagram provides a reference point 502 for the start of a transmission and reception window at the UE's serving base station (illustrated as a "gNB"). The reference point 502 may correspond to, for example, the start of a radio frame, a subframe, a slot, a symbol, etc. In each diagram, time is represented horizontally. As such, the horizontal position of each transmission and reception window with respect to the reference point 502 represents a relative location of the window in the time domain with respect to the reference point 502. A transmission and reception window may have a length of some number of radio frames, subframes, slots, symbols, etc.

As shown in diagram 500, the base station transmits downlink data to the UE during a downlink transmission (DL Tx) window 505. The UE receives those downlink data transmissions during a downlink reception (DL Rx) window 515 after some propagation delay, illustrated by the horizontal offset of the DL Rx window 515 from the reference point 502. Similarly, the UE transmits uplink data to the base station during an uplink transmission (UL Tx) window 520. The start of the UL Tx window 520 occurs before the reference point 502 to account for the propagation delay between the UE and the base station. The amount of time before the reference point 502 is the UE's timing advance (TA), and may be configured by the base station. In that way, the base station receives the uplink data during an uplink reception (UL Rx) window 510 that is aligned horizontally with the reference point 502.

As further shown in diagram 500, the UE aligns its sidelink timing with its downlink timing. Specifically, the UE aligns its sidelink transmission (SL Tx) window 525 with the DL Rx window 515. Diagram 500 further illustrates a sidelink reception (SL Rx) window 530 that starts after the SL Tx window 525 due to the propagation delay between the transmitter UE and the receiver UE.

As shown in diagram 550, as in diagram 500, the base station transmits downlink data to the UE during a DL Tx window 555. The UE receives those downlink data transmissions during a DL Rx window 565 after some propagation delay, illustrated by the horizontal offset of the DL Rx window 565 from the reference point 502. Similarly, the UE transmits uplink data to the base station during an UL Tx window 570. As in diagram 500, the start of the UL Tx window 570 occurs before the reference point 502 to account for the propagation delay between the UE and the base station. The amount of time before the reference point 502 is the UE's TA. In that way, the base station receives the uplink data during an UL Rx window 560 that is aligned horizontally with the reference point 502.

As further shown in diagram 550, in contrast to diagram 500, the UE aligns its sidelink timing with its uplink timing. Specifically, the UE aligns its SL Tx window 575 with the UL Tx window 570. Like diagram 500, diagram 550 further illustrates a SL Rx window 580 that starts after the SL Tx window 575 due to the propagation delay between the transmitter UE and the receiver UE.

Figure 6:
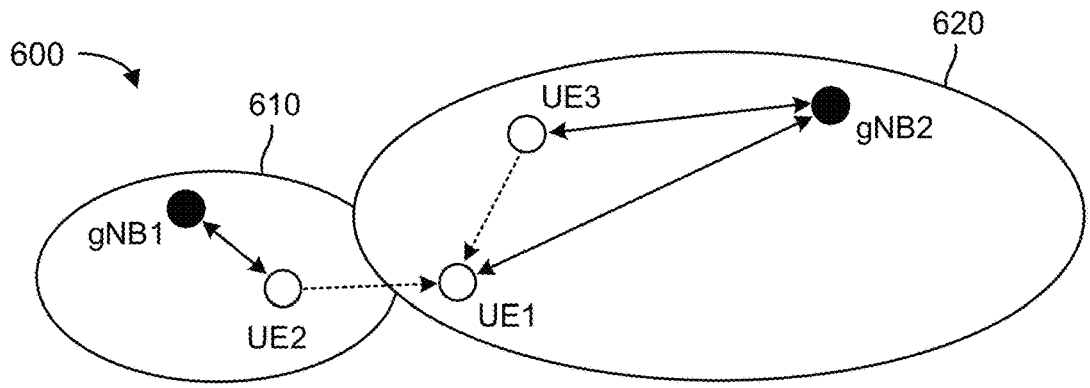
FIG. 6 is a diagram of another example scenario in which using downlink or uplink timing for sidelink transmissions can be problematic.

Various issues can arise with using downlink or uplink timing for sidelink transmissions. FIG. 6 is a diagram 600 of an example scenario in which such issues may arise. In the example of FIG. 6, a first base station (labeled "gNB1") has a geographic coverage area 610 adjacent to the geographic coverage area 620 of a second base station (labeled "gNB2"). A first and third UE (labeled "UE1" and "UE3," respectively) are located in geographic coverage area 620 and served by the second base station. A second UE (labeled "UE2") is located in geographic coverage area 610 and served by the first base station. The second and third UEs have established sidelinks with the first UE in order to transmit data to the first UE (illustrated by dashed lines).

The difference between the second and third UE's sidelink transmission times may be large due, for example, to the different propagation times to their respective base stations. It may also or alternatively be due to the respective base stations not being synchronized with each other. More specifically, each UE obtains its sidelink timing from either the uplink or downlink timing of its serving base station. In the example of FIG. 6, the third UE is close to the edge of geographic coverage area 620, and, as this coverage area is relatively large, there may be a relatively large propagation delay between the third UE and the second base station. In contrast, the second UE is much closer to the first base station, and therefore, there will be a smaller propagation delay between the second UE and the first base station. This difference in propagation delay may be further exacerbated if the first and second base stations are not synchronized with each other. As such, the downlink or uplink timing for the two UEs may be quite different, and their corresponding sidelink timing will be equally different. This can create an issue when the second and third UEs send sidelink data to the first UE at approximately the same time (e.g., in the same slot), as the data will arrive at the first UE at very different times.

Figure 7:
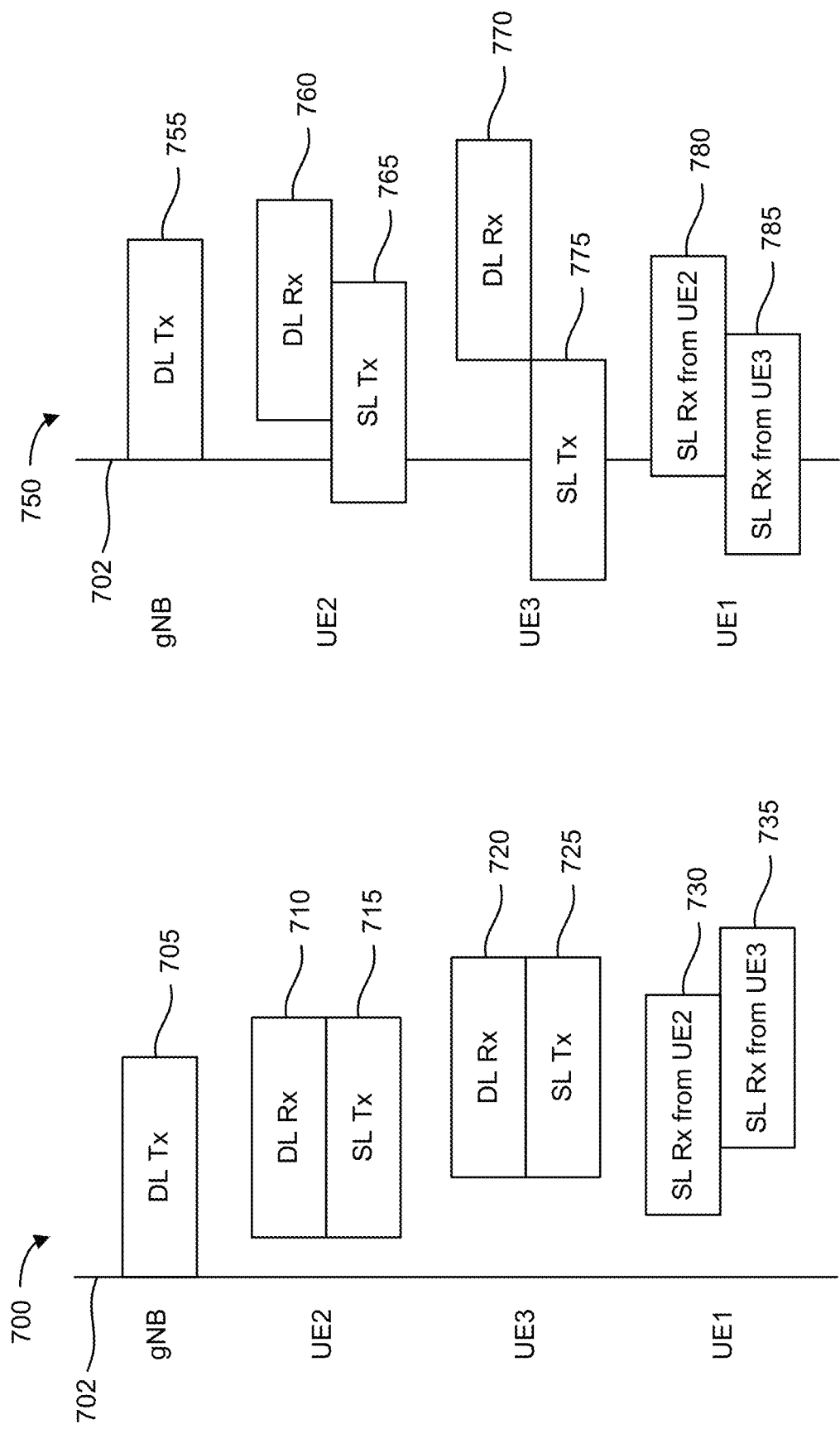
FIG. 7 illustrates a comparison between downlink timing and uplink timing for sidelink communication among three UEs

FIG. 7 illustrates a comparison between downlink timing and uplink timing for sidelink communication among three UEs, such as the three UEs illustrated in FIG. 6. Specifically, diagram 700 illustrates a downlink timing example and diagram 750 illustrates an uplink timing example. In the example of FIG. 7, a second and third UE, labeled "UE2" and "UE3," respectively, are served by the same base station, labeled "gNB," and have a sidelink to a first UE, labeled "UE1." The first UE may or may not be served by the same base station as the second and third UEs.

A vertical line in each diagram provides a reference point 702 for the start of a transmission and reception window at the base station serving the second and third UEs. The reference point 702 may correspond to, for example, the start of a radio frame, a subframe, a slot, a symbol, etc. In each diagram, time is represented horizontally. As such, the horizontal position of each transmission and reception window with respect to the reference point 702 represents a relative location of the window in the time domain with respect to the reference point 702. A transmission and reception window may have a length of some number of radio frames, subframes, slots, symbols, etc.

As shown in diagram 700, the base station transmits downlink data to the second UE during a DL Tx window 705. The second UE receives those downlink data transmissions during a DL Rx window 710 after some propagation delay, illustrated by the horizontal offset of the DL Rx window 710 from the reference point 702. Because the second UE is using downlink timing for its sidelink timing, the second UE aligns its SL Tx window 715 with its DL Rx window 710.

Similarly, the base station transmits downlink data to the third UE during the DL Tx window 705. The third UE receives those downlink data transmissions during a DL Rx window 720 after some propagation delay, illustrated by the horizontal offset of the DL Rx window 720 from the reference point 702. Because the third UE is using downlink timing for its sidelink timing, the third UE aligns its SL Tx window 725 with its DL Rx window 720.

At the first UE, diagram 700 illustrates an SL Rx window 730 for the second UE that starts after the SL Tx window 715 due to the propagation delay between the second UE and the first UE. Similarly, diagram 700 illustrates an SL Rx window 735 for the third UE that starts after the SL Tx window 725 due to the propagation delay between the third UE and the first UE.

As shown in diagram 750, as in diagram 700, the base station transmits downlink data to the second and third UEs during a DL Tx window 755. The second UE receives those downlink data transmissions during a DL Rx window 760 after some propagation delay, illustrated by the horizontal offset of the DL Rx window 760 from the reference point 702. Because the second UE is using uplink timing for its sidelink timing, the second UE aligns its SL Tx window 765 with its UL Tx window (not shown), which, due to the propagation delay between the second UE and the base station, starts before the reference point 702 by the amount of the second UE's TA, as described above with reference to FIG. 5.

As further shown in diagram 750, the third UE receives downlink data transmissions from the base station during a DL Rx window 770 after some propagation delay, illustrated by the horizontal offset of the DL Rx window 770 from the reference point 702. Because the third UE is also using uplink timing for its sidelink timing, the third UE aligns its SL Tx window 775 with its UL Tx window (not shown), which, due to the propagation delay between the third UE and the base station, starts before the reference point 702 by the amount of the third UE's TA.

At the first UE, diagram 750 illustrates an SL Rx window 780 for the second UE that starts after the SL Tx window 765 due to the propagation delay between the second UE and the first UE. Similarly, diagram 750 illustrates an SL Rx window 785 for the third UE that starts after the SL Tx window 775 due to the propagation delay between the third UE and the first UE.

In the example of FIG. 7, the propagation delay between the base station and the third UE is significantly longer than the propagation delay between the base station and the second UE. This could be due to the third UE being further away from the base station than the second UE. As such, there is a noticeable difference in time between the respective SL Tx windows 715 and 765 and 725 and 775 of the second and third UEs. At the first UE, this results in a significant difference in time between the start of the SL Rx windows 730 and 780 and the start of the SL Rx windows 735 and 785. This time difference may prevent the first UE from correctly receiving the sidelink data from the second and third UEs.

Figure 8:
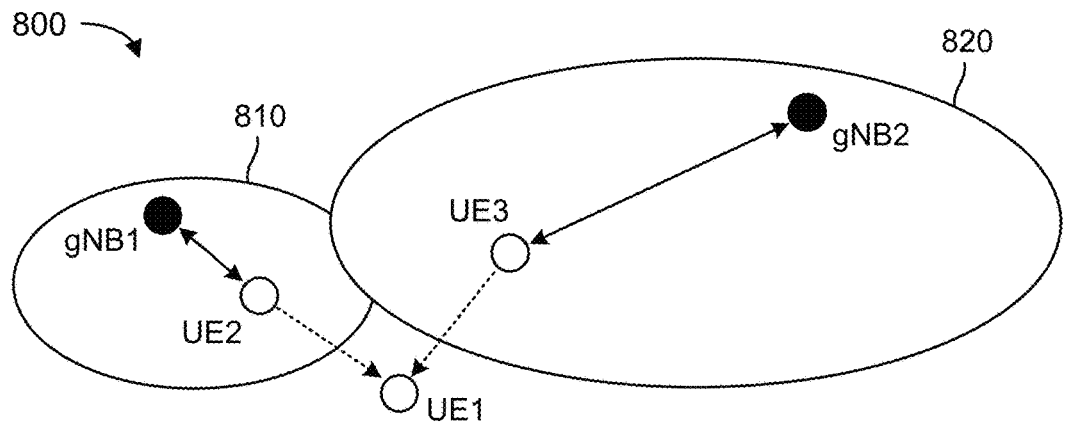
FIG. 8 is a diagram of another example scenario in which using downlink or uplink timing for sidelink transmissions can be problematic.

FIG. 8 is a diagram 800 of another example scenario in which using downlink or uplink timing for sidelink transmissions can be problematic. In the example of FIG. 8, a first base station (labeled "gNB1") has a geographic coverage area 810 adjacent to the geographic coverage area 820 of a second base station (labeled "gNB2"). A second UE (labeled "UE2") is located in geographic coverage area 810 and served by the first base station. A third UE (labeled "UE3") is located in geographic coverage area 820 and served by the second base station. A first UE (labeled "UE1") is not within the coverage area of either base station. The second and third UEs have established sidelinks with the first UE in order to transmit data to the first UE (illustrated by dashed lines).

The difference between the second and third UE's sidelink transmission times may be large due, for example, to the different propagation times to their respective base stations. It may also or alternatively be due to the respective base stations not being synchronized with each other. As such, the downlink or uplink timing for the two UEs may be quite different, and their corresponding sidelink timing will be equally different. This can create an issue when the first UE, out of the coverage areas of the first and second base stations, derives its timing from the second and third UEs.

Figure 9:
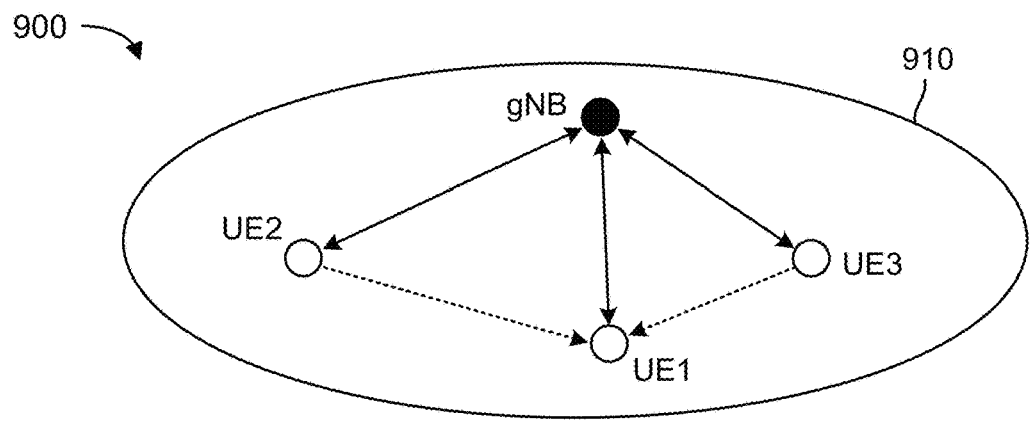
FIG. 9 is a diagram of another example scenario in which using downlink or uplink timing for sidelink transmissions can be problematic.

FIG. 9 is a diagram 900 of another example scenario in which using downlink or uplink timing for sidelink transmissions can be problematic. In the example of FIG. 9, a first, second, and third UE (labeled "UE1," "UE2," and "UE3," respectively) are located within the geographic coverage area 910 of the same base station (labeled "gNB"). The second and third UEs have established sidelinks with the first UE in order to transmit data to the first UE (illustrated by dashed lines).

The difference between the second and third UE's sidelink transmission times may be large due, for example, to the different propagation times to the base station, even though it is the same base station. As such, the downlink or uplink timing for the two UEs may be quite different, and their corresponding sidelink timing will be equally different.

The timing issues described above for multiple sidelinks can create an issue when the first UE and the second and third UEs, for example, use frequency-division multiplexing (FDM) to communicate over the respective sidelinks. Specifically, in FDM, different frequency resources (e.g., subcarriers, resource blocks, etc.) on the same time resources (e.g., OFDM symbol, slot, subframe, frame, etc.) are assigned to different sidelinks. Thus, during the same time period, the first UE may expect to receive sidelink data over the sidelinks with the second and third UEs on corresponding sets of frequency resources. However, if the sidelink data is not received during the same time period (e.g., the same slot), the first UE may not be able to decode the data.

To address this issue, among others, the present disclosure provides techniques for the receiver UE, rather than the transmitter UE, to determine the TA for a sidelink. As noted above, the TA is the amount of time before a reference point that a UE is expected to transmit data (either uplink or sidelink data) so that the data will arrive at the receiver (either a base station or another UE) at the expected time. The reference point may be the transmitter UE's current radio frame timing. The receiver may send TA commands to the transmitter UE to adjust the TA based on the actual reception time at the receiver.

At a high level, a receiver UE (e.g., the first UE in FIGS. 6, 8, 9) may be connected to multiple transmitter UEs (e.g., the second and third UEs in FIGS. 6, 8, 9) over respective sidelinks. The receiver UE may determine timing differences between the transmitter UEs based on reference signals (e.g., sidelink synchronization signals) received from the transmitter UEs. Based on these timing differences, the receiver UE can send one or more sidelink TA commands to one or more of the transmitter UEs instructing them to adjust their sidelink transmit time.

Figure 10:
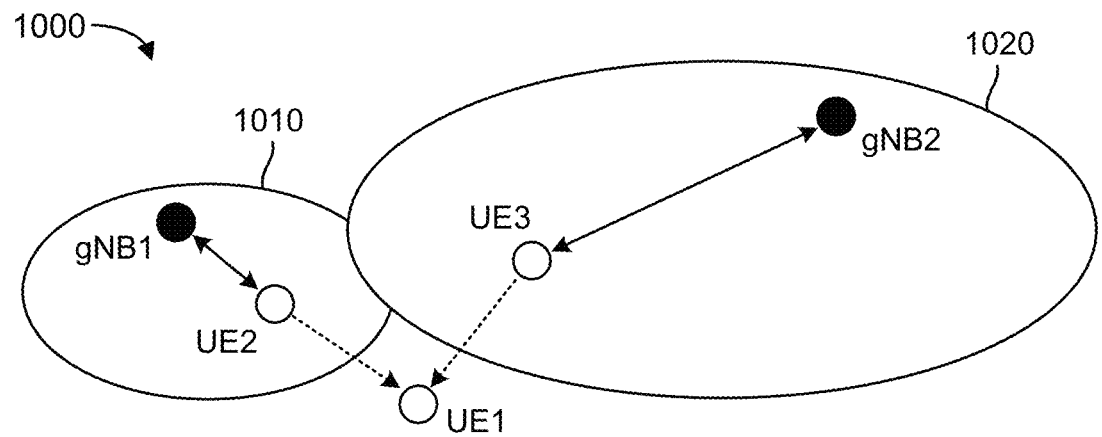
FIGS. 10 and 11 are diagrams and illustrating example scenarios in which a receiver UE may determine the timing adjust (TA) for sidelink communication.
Figure 11:
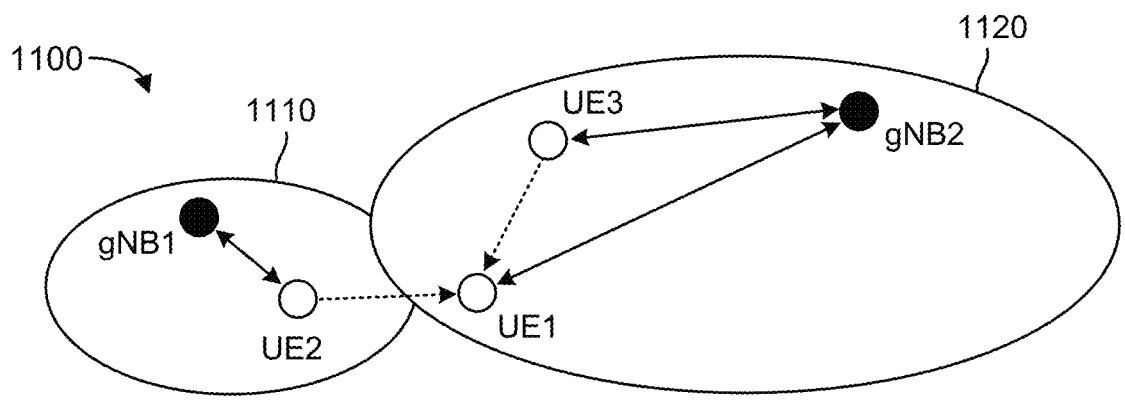

FIGS. 10 and 11 are diagrams 1000 and 1100 illustrating example scenarios in which a receiver UE may determine the TA for sidelink communication. A "receiver" UE, as used herein, is a UE receiving sidelink data from another UE (referred to as a "transmitter" UE). Although a receiver UE receives sidelink data, it may also transmit sidelink data. The distinction is that a receiver UE may transmits sidelink TA commands to the UE(s) from which it is receiving sidelink data to control the transmission times of the transmitter UE(s). For example, the transmitter UE(s) may be multicasting or broadcasting sidelink data to the receiver UE.

In the example of FIG. 10, a first base station (labeled "gNB1") has a geographic coverage area 1010 adjacent to the geographic coverage area 1020 of a second base station (labeled "gNB2"). A second UE (labeled "UE2") is located in geographic coverage area 1010 and served by the first base station. A third UE (labeled "UE3") is located in geographic coverage area 1020 and served by the second base station. A first UE (labeled "UE1") is not within the coverage area of either base station. The second and third UEs have established sidelinks with the first UE in order to transmit data to the first UE (illustrated by dashed lines).

In the example of FIG. 11, a first base station (labeled "gNB1") has a geographic coverage area 1110 adjacent to the geographic coverage area 1120 of a second base station (labeled "gNB2"). A first and third UE (labeled "UE1" and "UE3," respectively) are located in geographic coverage area 1120 and served by the second base station. A second UE (labeled "UE2") is located in geographic coverage area 1110 and served by the first base station. The second and third UEs have established sidelinks with the first UE in order to transmit data to the first UE (illustrated by dashed lines).

In both figures, the first UE is the receiver UE and can measure the timing difference between the second and third UEs (the transmitter UEs) based on, for example, reference signals received from the second and third UEs. For example, the timing difference may be the difference between the times of arrival (ToAs) of the reference signals from the second and third UEs. The reference signals may be SSBs or sidelink synchronization signals. For example, the reference signals may define (e.g., be received at the start of or have some offset with respect to) the SL Rx windows 730 and 735 or 780 and 785 in FIG. 7. In this case, the timing difference between the second and third UEs would be the difference between the start of the SL Rx windows 730 and 735 or 780 and 785. This may also be the same as the difference between the SL Tx windows 715 and 725 or 765 and 775.

Based on the determined timing difference between the second and third UEs, the first UE can send a sidelink TA command to one or both of the second and third UEs to adjust their sidelink transmit times. For example, the first UE may send a sidelink TA command to the second UE instructing it to align its transmit time with the third UE, or to the third UE instructing it to align its transmit time with the second UE. For example, the TA command may instruct the second or third UE to adjust its transmit time by the difference between the reception times of the reference signals from the second and third UEs. With reference to FIG. 7, the time difference would be the difference between the start of the SL Rx window 730 and the SL Rx window 735 or the SL Rx window 780 and the SL Rx window 785.

Alternatively, the first UE may send a sidelink TA command to both the second and third UEs to each adjust their sidelink transmit times. For example, the TA command to the second UE may instruct the second UE to adjust its transmit time by half the difference between the reception times of the reference signals from the second and third UEs. Likewise, the TA command to the third UE may instruct the third UE to adjust its transmit time by half the difference between the reception times of the reference signals from the second and third UEs.

Figure 12:
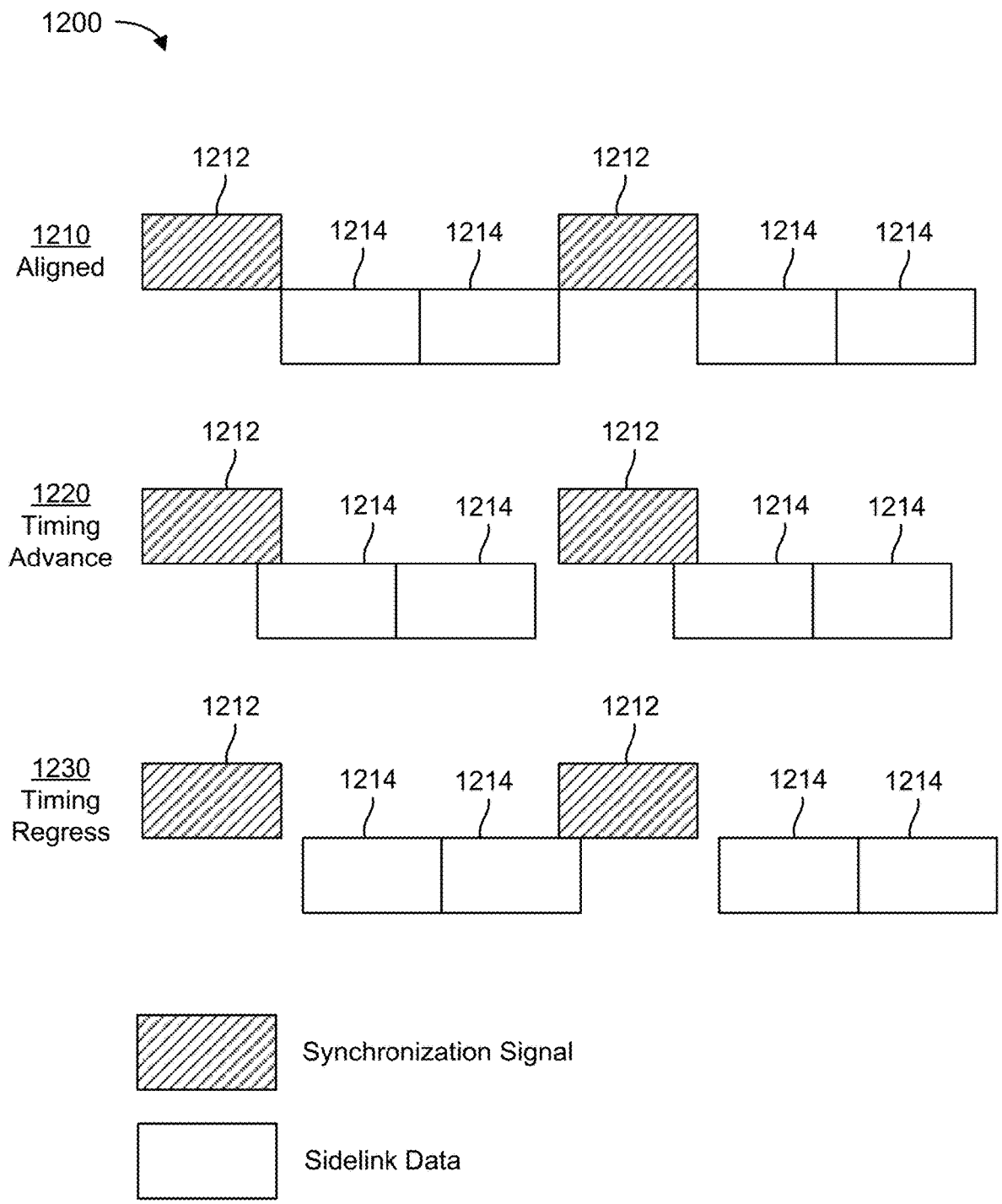
FIG. 12 is a diagram illustrating various types of time differences between sidelink synchronization signals and sidelink data transmissions.

FIG. 12 is a diagram 1200 illustrating various types of time differences between sidelink synchronization signals and sidelink data transmissions. A first timeline 1210 illustrates a scenario in which sidelink data transmissions to a remote UE are aligned with sidelink synchronization signals from that UE. Specifically, blocks 1212 represent sidelink synchronization signals and blocks 1214 represent sidelink data transmissions. In timeline 1210, the end of a sidelink synchronization signal block 1212 aligns with the start of a sidelink data transmission block 1214.

A second timeline 1220 illustrates a scenario in which sidelink data transmissions are not aligned with sidelink synchronization signals. Specifically, unlike the aligned case illustrated by timeline 1210, the start of a pair of sidelink data transmission blocks 1214 overlaps the end of a sidelink synchronization signal block 1212. The amount of the overlap is the timing advance for the UE receiving the sidelink synchronization signals. The receiver UE can signal the amount of this timing advance in a sidelink TA command.

A third timeline 1230 illustrates another scenario in which sidelink data transmissions are not aligned with sidelink synchronization signals. Specifically, unlike the aligned case illustrated by timeline 1210, there is a gap between the end of a sidelink synchronization signal block 1212 and the beginning of a sidelink data transmission block 1214. The amount of the gap is the timing regress for the UE receiving the sidelink synchronization signals. This can also be signaled in a sidelink TA command.

The sidelink synchronization signals in blocks 1212 may be SSBs or dedicated sidelink synchronization signal. The UE transmitting the sidelink synchronization signals in blocks 1212 may use its downlink timing (as described with reference to FIGS. 5 and 7) as the timing reference for the sidelink synchronization signals. That is, the transmitting UE may transmit the sidelink synchronization signals in blocks 1212 based on the time at which it receives downlink reference signals from its serving base station.

The UE transmitting the sidelink synchronization signals in blocks 1212 may also transmit the sidelink data in blocks 1214. The transmitter UE may adjust its sidelink TA based on a sidelink TA command received from the receiver UE to which it is transmitting the sidelink data. Specifically, after receiving one or more sidelink synchronization signals and/or sidelink data transmissions from the transmitter UE in blocks 1212 and 1214, the receiver UE may send a sidelink TA command to the transmitter UE to instruct the transmitter UE to adjust the transmission time of the sidelink data transmitted in blocks 1214. The value of the sidelink TA command may be determined as described above with reference to FIGS. 10 and 11.

In some cases, a transmitter UE may receive a sidelink TA command from more than one sidelink receiver UE. As such, the transmitter UE may be a need to prioritize the received sidelink TA commands. Sidelink control information (SCI) transmitted over a sidelink between two UEs includes a priority indication for the associated data traffic. This priority indication may not, however, apply to a sidelink TA command transmitted over that sidelink, depending on implementation. Instead, a priority field may be added to the MAC control element (MAC-CE) for a sidelink TA command. That is, a sidelink TA command may be transmitted over the sidelink in a MAC-CE, and the MAC-CE may include a priority field indicating the priority of the sidelink TA command.

For example, if a receiver UE only has one sidelink at a time and transmits a sidelink TA command to the remote UE, the receiver UE can assign a lower priority to the sidelink TA command compared with another case where the receiver UE has multiple sidelinks with multiple other UEs. In this case, if the remote UE does not follow the receiver UE's sidelink TA command (e.g., due to the lower priority), the receiver UE can adjust its receive time window instead.

The final sidelink timing adjust a transmitter UE determines may be based on the priorities of the received sidelink TA commands. In an aspect, if the transmitter UE's communications with its serving base station and the various sidelink receiver UEs are frequency-division multiplexed, the uplink TA command from the base station may have the highest priority. In that case, the transmitter UE may not be able to adjust its timing adjust for the various sidelinks over which it is transmitting. Alternatively, the transmitter UE may be able to request a change to its uplink timing adjust to (better) align with the received sidelink TA commands.

Where there are conflicting sidelink TA commands, the transmitter UE may determine a weighted average of the requested timing adjustments in the received sidelink TA commands. In this case, the weights may be based on the priority associated with each sidelink TA command. The priorities may be received with the sidelink TA command (e.g., in the same MAC-CE) or determined by the transmitter UE. For example, the transmitter UE may calculate the priority of a received sidelink TA command based on the signal strength (e.g., RSRP) of the sidelink synchronization signal(s) received from the receiver UE transmitting the sidelink TA command. Alternatively or additionally, the priority may be based on the sidelink beam on which the sidelink synchronization signal was received. For example, the receiver UE may be receiving traffic over multiple sidelinks with different respective traffic priorities. The receiver UE may be using different receive beams for the different sidelinks (including the corresponding sidelink synchronization signals). A receive beam associated with a higher priority traffic stream will have a higher priority when setting the sidelink TA command.

Figure 13:
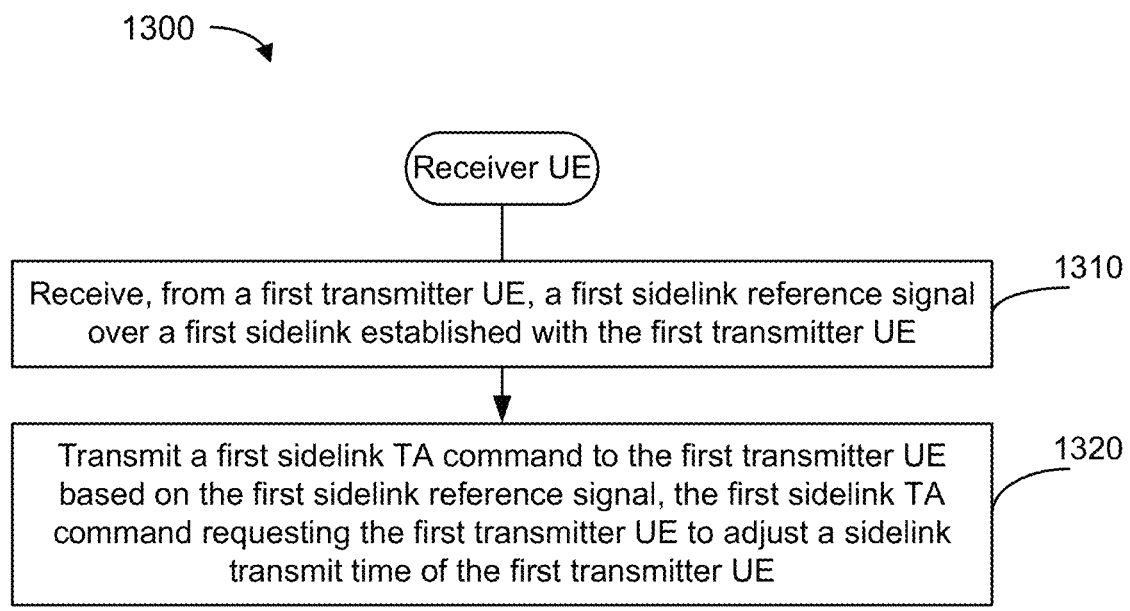
FIGS. 13 and 14 illustrate example methods for wireless communication, according to aspects of the disclosure.

FIG. 13 illustrates an example method 1300 for wireless communication, according to aspects of the disclosure. In an aspect, the method 1300 may be performed by a receiver UE (e.g., any of the UEs described herein).

At 1310, the receiver UE receives, from a first transmitter UE (e.g., any of the UEs described herein), a first sidelink reference signal over a first sidelink established with the first transmitter UE. In an aspect, operation 1310 may be performed by the one or more transceivers 404, the one or more processors 410, memory 414, and/or sidelink manager 470, any or all of which may be considered means for performing this operation.

At 1320, the receiver UE transmits a first sidelink TA command to the first transmitter UE based on the first sidelink reference signal, the first sidelink TA command requesting the first transmitter UE to adjust a sidelink transmit time of the first transmitter UE. In an aspect, operation 1320 may be performed by the one or more transceivers 404, the one or more processors 410, memory 414, and/or sidelink manager 470, any or all of which may be considered means for performing this operation.

A technical advantage of the method 1300 is that it enables the receiver UE to align the sidelink transmission times of one or more transmitter UEs with a desired sidelink reception window.

Figure 14:
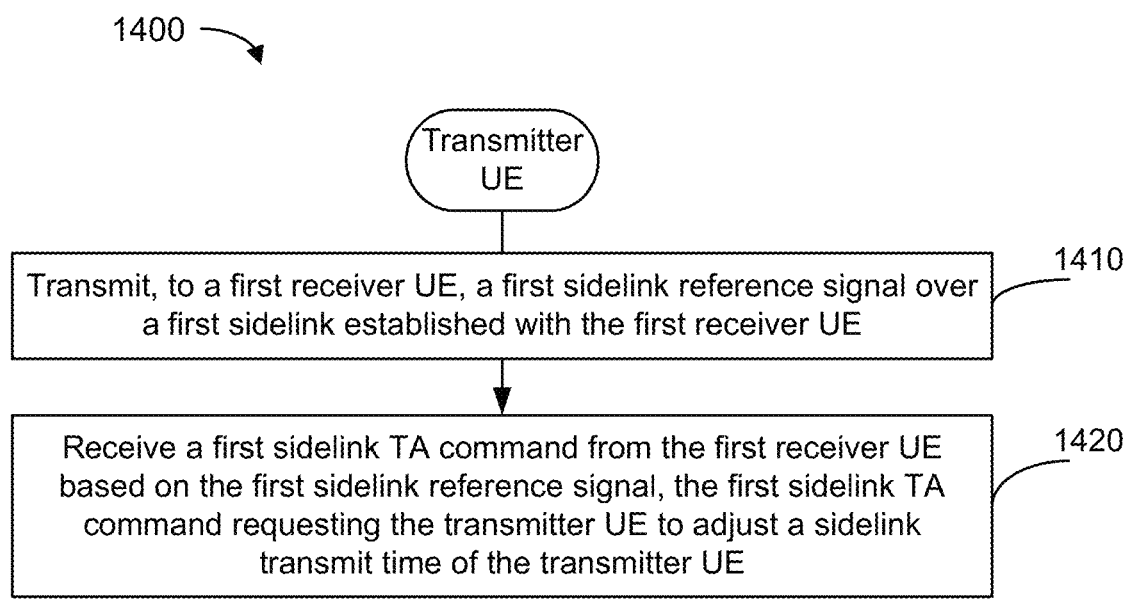

FIG. 14 illustrates an example method 1400 for wireless communication, according to aspects of the disclosure. In an aspect, the method 1400 may be performed by a transmitter UE (e.g., any of the UEs described herein).

At 1410, the transmitter UE transmits, to a first receiver UE (e.g., any of the UEs described herein), a first sidelink reference signal over a first sidelink established with the first receiver UE. In an aspect, operation 1410 may be performed by the one or more transceivers 404, the one or more processors 410, memory 414, and/or sidelink manager 470, any or all of which may be considered means for performing this operation.

At 1420, the transmitter UE receives a first sidelink TA command from the first receiver UE based on the first sidelink reference signal, the first sidelink TA command requesting the transmitter UE to adjust a sidelink transmit time of the transmitter UE. In an aspect, operation 1420 may be performed by the one or more transceivers 404, the one or more processors 410, memory 414, and/or sidelink manager 470, any or all of which may be considered means for performing this operation.

A technical advantage of the method 1400 is that it enables the transmitter UE align its sidelink transmission time to enable one or more receiver UEs to better receive sidelink transmissions from the transmitter UE.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method for wireless communication performed by a receiver user equipment (UE), comprising: receiving, from a first transmitter UE, a first sidelink reference signal over a first sidelink established with the first transmitter UE; and transmitting a first sidelink timing adjust (TA) command to the first transmitter UE based on the first sidelink reference signal, the first sidelink TA command requesting the first transmitter UE to adjust a sidelink transmit time of the first transmitter UE.

Clause 2. The method of clause 1, further comprising: receiving, from a second transmitter UE, a second sidelink reference signal over a second sidelink established with the second transmitter UE; and transmitting a second sidelink TA command to the second transmitter UE based on the second sidelink reference signal, the second sidelink TA command requesting the second transmitter UE to adjust a sidelink transmit time of the second transmitter UE.

Clause 3. The method of clause 2, further comprising: determining a timing difference between the first sidelink reference signal and the second sidelink reference signal.

Clause 4. The method of clause 3, wherein the timing difference comprises a difference between a time of arrival (ToA) of the first sidelink reference signal and a ToA of the second sidelink reference signal.

Clause 5. The method of any of clauses 3 to 4, wherein the timing difference is included in the first sidelink TA command as a requested timing adjustment for the sidelink transmit time of the first transmitter UE.

Clause 6. The method of any of clauses 3 to 5, wherein: a first portion of the timing difference is included in the first sidelink TA command as a requested timing adjustment for the sidelink transmit time of the first transmitter UE, and a second portion of the timing difference is included in the second sidelink TA command as a requested timing adjustment for the sidelink transmit time of the second transmitter UE.

Clause 7. The method of any of clauses 2 to 6, wherein the second sidelink TA command includes the same timing adjustment as the first sidelink TA command.

Clause 8. The method of any of clauses 2 to 6, wherein the second sidelink TA command includes a different timing adjustment from the first sidelink TA command.

Clause 9. The method of any of clauses 2 to 8, wherein the first sidelink and the second sidelink are frequency-division multiplexed.

Clause 10. The method of any of clauses 1 to 9, wherein the receiver UE transmits the first sidelink TA command in a medium access control control element (MAC-CE).

Clause 11. The method of any of clauses 1 to 10, wherein the first sidelink TA command includes a priority field indicating a priority of the first sidelink TA command.

Clause 12. The method of any of clauses 1 to 11, wherein: the receiver UE transmits the first sidelink TA command to a base station serving the receiver UE, and the first sidelink TA command is forwarded by the base station serving the receiver UE to a base station serving the first transmitter UE.

Clause 13. The method of any of clauses 1 to 12, wherein the first sidelink reference signal comprises a synchronization signal block (SSB) or a dedicated sidelink synchronization signal.

Clause 14. A method for wireless communication performed by a transmitter user equipment (UE), comprising: transmitting, to a first receiver UE, a first sidelink reference signal over a first sidelink established with the first receiver UE; and receiving a first sidelink timing adjust (TA) command from the first receiver UE based on the first sidelink reference signal, the first sidelink TA command requesting the transmitter UE to adjust a sidelink transmit time of the transmitter UE.

Clause 15. The method of clause 14, further comprising: transmitting, to a second receiver UE, a second sidelink reference signal over a second sidelink established with the second receiver UE; and receiving a second sidelink TA command from the second receiver UE based on the second sidelink reference signal, the second sidelink TA command requesting the transmitter UE to adjust the sidelink transmit time of the transmitter UE.

Clause 16. The method of clause 15, further comprising: determining the sidelink transmit time of the transmitter UE based on a weighted average of the first sidelink TA command and the second sidelink TA command.

Clause 17. The method of clause 16, wherein: a weight of the first sidelink TA command for the weighted average is based on a priority field included in the first sidelink TA command, a signal strength of a sidelink reference signal received from the first receiver UE, a sidelink beam associated with the sidelink reference signal received from the first receiver UE, or any combination thereof, and a weight of the second sidelink TA command for the weighted average is based on a priority field included in the second sidelink TA command, a signal strength of a sidelink reference signal received from the second receiver UE, a sidelink beam associated with the sidelink reference signal received from the second receiver UE, or any combination thereof.

Clause 18. The method of any of clauses 15 to 17, further comprising: determining the sidelink transmit time of the transmitter UE based on which of the first sidelink TA command and the second sidelink TA command has a higher priority.

Clause 19. The method of clause 18, wherein: the first sidelink TA command includes a priority field indicating a priority of the first sidelink TA command, and the second sidelink TA command includes a priority field indicating a priority of the second sidelink TA command.

Clause 20. The method of any of clauses 14 to 19, wherein the first sidelink is frequency-division multiplexed with an uplink channel to a base station serving the transmitter UE.

Clause 21. The method of clause 20, further comprising: receiving, from the base station, an uplink TA command, wherein the uplink TA command has a higher priority than the first sidelink TA command.

Clause 22. The method of clause 21, further comprising: ignoring the first sidelink TA command based on reception of the uplink TA command.

Clause 23. The method of any of clauses 14 to 22, wherein the transmitter UE receives the first sidelink TA command in a medium access control control element (MAC-CE).

Clause 24. The method of any of clauses 14 to 23, wherein the transmitter UE receives the first sidelink TA command from a base station serving the transmitter UE.

Clause 25. The method of any of clauses 14 to 24, wherein the first sidelink reference signal comprises a synchronization signal block (SSB) or a dedicated sidelink synchronization signal.

Clause 26. An apparatus comprising a memory, at least one transceiver, and at least one processor communicatively coupled to the memory and the at least one transceiver, the memory, the at least one transceiver, and the at least one processor configured to perform a method according to any of clauses 1 to 25.

Clause 27. An apparatus comprising means for performing a method according to any of clauses 1 to 25.

Clause 28. A non-transitory computer-readable medium storing computer-executable instructions, the computer-executable comprising at least one instruction for causing a computer or processor to perform a method according to any of clauses 1 to 25.

Additional implementation examples are described in the following numbered clauses:

Clause 1. A method for wireless communication performed by a receiver user equipment (UE), comprising: receiving, from a first transmitter UE, a first sidelink reference signal over a first sidelink established with the first transmitter UE; and transmitting a first sidelink timing adjust (TA) command to the first transmitter UE based on the first sidelink reference signal, the first sidelink TA command requesting the first transmitter UE to adjust a sidelink transmit time of the first transmitter UE.

Clause 2. The method of clause 1, further comprising: receiving, from a second transmitter UE, a second sidelink reference signal over a second sidelink established with the second transmitter UE; and transmitting a second sidelink TA command to the second transmitter UE based on the second sidelink reference signal, the second sidelink TA command requesting the second transmitter UE to adjust a sidelink transmit time of the second transmitter UE.

Clause 3. The method of clause 2, further comprising: determining a timing difference between the first sidelink reference signal and the second sidelink reference signal.

Clause 4. The method of clause 3, wherein the timing difference comprises a difference between a time of arrival (ToA) of the first sidelink reference signal and a ToA of the second sidelink reference signal.

Clause 5. The method of any of clauses 3 to 4, wherein the timing difference is included in the first sidelink TA command as a requested timing adjustment for the sidelink transmit time of the first transmitter UE.

Clause 6. The method of any of clauses 3 to 4, wherein: a first portion of the timing difference is included in the first sidelink TA command as a requested timing adjustment for the sidelink transmit time of the first transmitter UE, and a second portion of the timing difference is included in the second sidelink TA command as a requested timing adjustment for the sidelink transmit time of the second transmitter UE.

Clause 7. The method of any of clauses 2 to 6, wherein the second sidelink TA command includes the same timing adjustment as the first sidelink TA command.

Clause 8. The method of any of clauses 2 to 6, wherein the second sidelink TA command includes a different timing adjustment from the first sidelink TA command.

Clause 9. The method of any of clauses 2 to 8, wherein the first sidelink and the second sidelink are frequency-division multiplexed.

Clause 10. The method of any of clauses 1 to 9, wherein the first sidelink TA command is transmitted in a medium access control control element (MAC-CE) or sidelink control information (SCI).

Clause 11. The method of any of clauses 1 to 10, wherein the first sidelink TA command includes a priority field indicating a priority of the first sidelink TA command.

Clause 12. The method of any of clauses 1 to 11, wherein: the first sidelink TA command is transmitted to a base station serving the receiver UE, and the first sidelink TA command is forwarded by the base station serving the receiver UE to a base station serving the first transmitter UE.

Clause 13. The method of any of clauses 1 to 12, wherein the first sidelink reference signal comprises a synchronization signal block (SSB) or a sidelink synchronization signal.

Clause 14. A method for wireless communication performed by a transmitter user equipment (UE), comprising: transmitting, to a first receiver UE, a first sidelink reference signal over a first sidelink established with the first receiver UE; and receiving a first sidelink timing adjust (TA) command from the first receiver UE based on the first sidelink reference signal, the first sidelink TA command requesting the transmitter UE to adjust a sidelink transmit time of the transmitter UE.

Clause 15. The method of clause 14, further comprising: transmitting, to a second receiver UE, a second sidelink reference signal over a second sidelink established with the second receiver UE; and receiving a second sidelink TA command from the second receiver UE based on the second sidelink reference signal, the second sidelink TA command requesting the transmitter UE to adjust the sidelink transmit time of the transmitter UE.

Clause 16. The method of clause 15, further comprising: determining the sidelink transmit time of the transmitter UE based on a weighted average of the first sidelink TA command and the second sidelink TA command.

Clause 17. The method of clause 16, wherein: a weight of the first sidelink TA command for the weighted average is based on a priority field included in the first sidelink TA command, a signal strength of a sidelink reference signal received from the first receiver UE, a sidelink beam associated with the sidelink reference signal received from the first receiver UE, or any combination thereof, and a weight of the second sidelink TA command for the weighted average is based on a priority field included in the second sidelink TA command, a signal strength of a sidelink reference signal received from the second receiver UE, a sidelink beam associated with the sidelink reference signal received from the second receiver UE, or any combination thereof.

Clause 18. The method of any of clauses 15 to 17, further comprising: determining the sidelink transmit time of the transmitter UE based on which of the first sidelink TA command and the second sidelink TA command has a higher priority.

Clause 19. The method of clause 18, wherein: the first sidelink TA command includes a priority field indicating a priority of the first sidelink TA command, the second sidelink TA command includes a priority field indicating a priority of the second sidelink TA command, or any combination thereof.

Clause 20. The method of any of clauses 14 to 19, wherein the first sidelink is frequency-division multiplexed with an uplink channel to a base station serving the transmitter UE.

Clause 21. The method of clause 20, further comprising: receiving, from the base station, an uplink TA command, wherein the uplink TA command has a higher priority than the first sidelink TA command.

Clause 22. The method of clause 21, further comprising: ignoring the first sidelink TA command based on reception of the uplink TA command.

Clause 23. The method of any of clauses 14 to 22, wherein the first sidelink TA command is received in a medium access control control element (MAC-CE) or sidelink control information (SCI).

Clause 24. The method of any of clauses 14 to 23, wherein the first sidelink TA command is received from a base station serving the transmitter UE.

Clause 25. The method of any of clauses 14 to 24, wherein the first sidelink reference signal comprises a synchronization signal block (SSB) or a sidelink synchronization signal.

Clause 26. A receiver user equipment (UE), comprising: a memory; at least one transceiver; and at least one processor communicatively coupled to the memory and the at least one transceiver, the at least one processor configured to: receive, via the at least one transceiver, from a first transmitter UE, a first sidelink reference signal over a first sidelink established with the first transmitter UE; and transmit, via the at least one transceiver, a first sidelink timing adjust (TA) command to the first transmitter UE based on the first sidelink reference signal, the first sidelink TA command requesting the first transmitter UE to adjust a sidelink transmit time of the first transmitter UE.

Clause 27. The receiver UE of clause 26, wherein the at least one processor is further configured to: receive, via the at least one transceiver, from a second transmitter UE, a second sidelink reference signal over a second sidelink established with the second transmitter UE; and transmit, via the at least one transceiver, a second sidelink TA command to the second transmitter UE based on the second sidelink reference signal, the second sidelink TA command requesting the second transmitter UE to adjust a sidelink transmit time of the second transmitter UE.

Clause 28. The receiver UE of clause 27, wherein the at least one processor is further configured to: determine a timing difference between the first sidelink reference signal and the second sidelink reference signal.

Clause 29. The receiver UE of clause 28, wherein the timing difference comprises a difference between a time of arrival (ToA) of the first sidelink reference signal and a ToA of the second sidelink reference signal.

Clause 30. The receiver UE of any of clauses 28 to 29, wherein the timing difference is included in the first sidelink TA command as a requested timing adjustment for the sidelink transmit time of the first transmitter UE.

Clause 31. The receiver UE of any of clauses 28 to 29, wherein: a first portion of the timing difference is included in the first sidelink TA command as a requested timing adjustment for the sidelink transmit time of the first transmitter UE, and a second portion of the timing difference is included in the second sidelink TA command as a requested timing adjustment for the sidelink transmit time of the second transmitter UE.

Clause 32. The receiver UE of any of clauses 27 to 31, wherein the second sidelink TA command includes the same timing adjustment as the first sidelink TA command.

Clause 33. The receiver UE of any of clauses 27 to 31, wherein the second sidelink TA command includes a different timing adjustment from the first sidelink TA command.

Clause 34. The receiver UE of any of clauses 27 to 33, wherein the first sidelink and the second sidelink are frequency-division multiplexed.

Clause 35. The receiver UE of any of clauses 26 to 34, wherein the first sidelink TA command is transmitted in a medium access control control element (MAC-CE) or sidelink control information (SCI).

Clause 36. The receiver UE of any of clauses 26 to 35, wherein the first sidelink TA command includes a priority field indicating a priority of the first sidelink TA command.

Clause 37. The receiver UE of any of clauses 26 to 36, wherein: the first sidelink TA command is transmitted to a base station serving the receiver UE, and the first sidelink TA command is forwarded by the base station serving the receiver UE to a base station serving the first transmitter UE.

Clause 38. The receiver UE of any of clauses 26 to 37, wherein the first sidelink reference signal comprises a synchronization signal block (SSB) or a sidelink synchronization signal.

Clause 39. A transmitter user equipment (UE), comprising: a memory; at least one transceiver; and at least one processor communicatively coupled to the memory and the at least one transceiver, the at least one processor configured to: transmit, via the at least one transceiver, to a first receiver UE, a first sidelink reference signal over a first sidelink established with the first receiver UE; and receive, via the at least one transceiver, a first sidelink timing adjust (TA) command from the first receiver UE based on the first sidelink reference signal, the first sidelink TA command requesting the transmitter UE to adjust a sidelink transmit time of the transmitter UE.

Clause 40. The transmitter UE of clause 39, wherein the at least one processor is further configured to: transmit, via the at least one transceiver, to a second receiver UE, a second sidelink reference signal over a second sidelink established with the second receiver UE; and receive, via the at least one transceiver, a second sidelink TA command from the second receiver UE based on the second sidelink reference signal, the second sidelink TA command requesting the transmitter UE to adjust the sidelink transmit time of the transmitter UE.

Clause 41. The transmitter UE of clause 40, wherein the at least one processor is further configured to: determine the sidelink transmit time of the transmitter UE based on a weighted average of the first sidelink TA command and the second sidelink TA command.

Clause 42. The transmitter UE of clause 41, wherein: a weight of the first sidelink TA command for the weighted average is based on a priority field included in the first sidelink TA command, a signal strength of a sidelink reference signal received from the first receiver UE, a sidelink beam associated with the sidelink reference signal received from the first receiver UE, or any combination thereof, and a weight of the second sidelink TA command for the weighted average is based on a priority field included in the second sidelink TA command, a signal strength of a sidelink reference signal received from the second receiver UE, a sidelink beam associated with the sidelink reference signal received from the second receiver UE, or any combination thereof.

Clause 43. The transmitter UE of any of clauses 40 to 42, wherein the at least one processor is further configured to: determine the sidelink transmit time of the transmitter UE based on which of the first sidelink TA command and the second sidelink TA command has a higher priority.

Clause 44. The transmitter UE of clause 43, wherein: the first sidelink TA command includes a priority field indicating a priority of the first sidelink TA command, the second sidelink TA command includes a priority field indicating a priority of the second sidelink TA command, or any combination thereof.

Clause 45. The transmitter UE of any of clauses 39 to 44, wherein the first sidelink is frequency-division multiplexed with an uplink channel to a base station serving the transmitter UE.

Clause 46. The transmitter UE of clause 45, wherein the at least one processor is further configured to: receive, via the at least one transceiver, from the base station, an uplink TA command, wherein the uplink TA command has a higher priority than the first sidelink TA command.

Clause 47. The transmitter UE of clause 46, wherein the at least one processor is further configured to: ignore the first sidelink TA command based on reception of the uplink TA command.

Clause 48. The transmitter UE of any of clauses 39 to 47, wherein the first sidelink TA command is received in a medium access control control element (MAC-CE) or sidelink control information (SCI).

Clause 49. The transmitter UE of any of clauses 39 to 48, wherein the first sidelink TA command is received from a base station serving the transmitter UE.

Clause 50. The transmitter UE of any of clauses 39 to 49, wherein the first sidelink reference signal comprises a synchronization signal block (SSB) or a sidelink synchronization signal.

Clause 51. A receiver user equipment (UE), comprising: means for receiving, from a first transmitter UE, a first sidelink reference signal over a first sidelink established with the first transmitter UE; and means for transmitting a first sidelink timing adjust (TA) command to the first transmitter UE based on the first sidelink reference signal, the first sidelink TA command requesting the first transmitter UE to adjust a sidelink transmit time of the first transmitter UE.

Clause 52. The receiver UE of clause 51, further comprising: means for receiving, from a second transmitter UE, a second sidelink reference signal over a second sidelink established with the second transmitter UE; and means for transmitting a second sidelink TA command to the second transmitter UE based on the second sidelink reference signal, the second sidelink TA command requesting the second transmitter UE to adjust a sidelink transmit time of the second transmitter UE.

Clause 53. The receiver UE of clause 52, further comprising: means for determining a timing difference between the first sidelink reference signal and the second sidelink reference signal.

Clause 54. The receiver UE of clause 53, wherein the timing difference comprises a difference between a time of arrival (ToA) of the first sidelink reference signal and a ToA of the second sidelink reference signal.

Clause 55. The receiver UE of any of clauses 53 to 54, wherein the timing difference is included in the first sidelink TA command as a requested timing adjustment for the sidelink transmit time of the first transmitter UE.

Clause 56. The receiver UE of any of clauses 53 to 54, wherein: a first portion of the timing difference is included in the first sidelink TA command as a requested timing adjustment for the sidelink transmit time of the first transmitter UE, and a second portion of the timing difference is included in the second sidelink TA command as a requested timing adjustment for the sidelink transmit time of the second transmitter UE.

Clause 57. The receiver UE of any of clauses 52 to 56, wherein the second sidelink TA command includes the same timing adjustment as the first sidelink TA command.

Clause 58. The receiver UE of any of clauses 52 to 56, wherein the second sidelink TA command includes a different timing adjustment from the first sidelink TA command.

Clause 59. The receiver UE of any of clauses 52 to 58, wherein the first sidelink and the second sidelink are frequency-division multiplexed.

Clause 60. The receiver UE of any of clauses 51 to 59, wherein the first sidelink TA command is transmitted in a medium access control control element (MAC-CE) or sidelink control information (SCI).

Clause 61. The receiver UE of any of clauses 51 to 60, wherein the first sidelink TA command includes a priority field indicating a priority of the first sidelink TA command.

Clause 62. The receiver UE of any of clauses 51 to 61, wherein: the first sidelink TA command is transmitted to a base station serving the receiver UE, and the first sidelink TA command is forwarded by the base station serving the receiver UE to a base station serving the first transmitter UE.

Clause 63. The receiver UE of any of clauses 51 to 62, wherein the first sidelink reference signal comprises a synchronization signal block (SSB) or a sidelink synchronization signal.

Clause 64. A transmitter user equipment (UE), comprising: means for transmitting, to a first receiver UE, a first sidelink reference signal over a first sidelink established with the first receiver UE; and means for receiving a first sidelink timing adjust (TA) command from the first receiver UE based on the first sidelink reference signal, the first sidelink TA command requesting the transmitter UE to adjust a sidelink transmit time of the transmitter UE.

Clause 65. The transmitter UE of clause 64, further comprising: means for transmitting, to a second receiver UE, a second sidelink reference signal over a second sidelink established with the second receiver UE; and means for receiving a second sidelink TA command from the second receiver UE based on the second sidelink reference signal, the second sidelink TA command requesting the transmitter UE to adjust the sidelink transmit time of the transmitter UE.

Clause 66. The transmitter UE of clause 65, further comprising: means for determining the sidelink transmit time of the transmitter UE based on a weighted average of the first sidelink TA command and the second sidelink TA command.

Clause 67. The transmitter UE of clause 66, wherein: a weight of the first sidelink TA command for the weighted average is based on a priority field included in the first sidelink TA command, a signal strength of a sidelink reference signal received from the first receiver UE, a sidelink beam associated with the sidelink reference signal received from the first receiver UE, or any combination thereof, and a weight of the second sidelink TA command for the weighted average is based on a priority field included in the second sidelink TA command, a signal strength of a sidelink reference signal received from the second receiver UE, a sidelink beam associated with the sidelink reference signal received from the second receiver UE, or any combination thereof.

Clause 68. The transmitter UE of any of clauses 65 to 67, further comprising: means for determining the sidelink transmit time of the transmitter UE based on which of the first sidelink TA command and the second sidelink TA command has a higher priority.

Clause 69. The transmitter UE of clause 68, wherein: the first sidelink TA command includes a priority field indicating a priority of the first sidelink TA command, the second sidelink TA command includes a priority field indicating a priority of the second sidelink TA command, or any combination thereof.

Clause 70. The transmitter UE of any of clauses 64 to 69, wherein the first sidelink is frequency-division multiplexed with an uplink channel to a base station serving the transmitter UE.

Clause 71. The transmitter UE of clause 70, further comprising: means for receiving, from the base station, an uplink TA command, wherein the uplink TA command has a higher priority than the first sidelink TA command.

Clause 72. The transmitter UE of clause 71, further comprising: means for ignoring the first sidelink TA command based on reception of the uplink TA command.

Clause 73. The transmitter UE of any of clauses 64 to 72, wherein the first sidelink TA command is received in a medium access control control element (MAC-CE) or sidelink control information (SCI).

Clause 74. The transmitter UE of any of clauses 64 to 73, wherein the first sidelink TA command is received from a base station serving the transmitter UE.

Clause 75. The transmitter UE of any of clauses 64 to 74, wherein the first sidelink reference signal comprises a synchronization signal block (SSB) or a sidelink synchronization signal.

Clause 76. A non-transitory computer-readable medium storing computer-executable instructions that, when executed by a receiver user equipment (UE), cause the receiver UE to: receive, from a first transmitter UE, a first sidelink reference signal over a first sidelink established with the first transmitter UE; and transmit a first sidelink timing adjust (TA) command to the first transmitter UE based on the first sidelink reference signal, the first sidelink TA command requesting the first transmitter UE to adjust a sidelink transmit time of the first transmitter UE.

Clause 77. The non-transitory computer-readable medium of clause 76, further comprising computer-executable instructions that, when executed by the receiver UE, cause the receiver UE to: receive, from a second transmitter UE, a second sidelink reference signal over a second sidelink established with the second transmitter UE; and transmit a second sidelink TA command to the second transmitter UE based on the second sidelink reference signal, the second sidelink TA command requesting the second transmitter UE to adjust a sidelink transmit time of the second transmitter UE.

Clause 78. The non-transitory computer-readable medium of clause 77, further comprising computer-executable instructions that, when executed by the receiver UE, cause the receiver UE to: determine a timing difference between the first sidelink reference signal and the second sidelink reference signal.

Clause 79. The non-transitory computer-readable medium of clause 78, wherein the timing difference comprises a difference between a time of arrival (ToA) of the first sidelink reference signal and a ToA of the second sidelink reference signal.

Clause 80. The non-transitory computer-readable medium of any of clauses 78 to 79, wherein the timing difference is included in the first sidelink TA command as a requested timing adjustment for the sidelink transmit time of the first transmitter UE.

Clause 81. The non-transitory computer-readable medium of any of clauses 78 to 79, wherein: a first portion of the timing difference is included in the first sidelink TA command as a requested timing adjustment for the sidelink transmit time of the first transmitter UE, and a second portion of the timing difference is included in the second sidelink TA command as a requested timing adjustment for the sidelink transmit time of the second transmitter UE.

Clause 82. The non-transitory computer-readable medium of any of clauses 77 to 81, wherein the second sidelink TA command includes the same timing adjustment as the first sidelink TA command.

Clause 83. The non-transitory computer-readable medium of any of clauses 77 to 81, wherein the second sidelink TA command includes a different timing adjustment from the first sidelink TA command.

Clause 84. The non-transitory computer-readable medium of any of clauses 77 to 83, wherein the first sidelink and the second sidelink are frequency-division multiplexed.

Clause 85. The non-transitory computer-readable medium of any of clauses 76 to 84, wherein the first sidelink TA command is transmitted in a medium access control control element (MAC-CE) or sidelink control information (SCI).

Clause 86. The non-transitory computer-readable medium of any of clauses 76 to 85, wherein the first sidelink TA command includes a priority field indicating a priority of the first sidelink TA command.

Clause 87. The non-transitory computer-readable medium of any of clauses 76 to 86, wherein: the first sidelink TA command is transmitted to a base station serving the receiver UE, and the first sidelink TA command is forwarded by the base station serving the receiver UE to a base station serving the first transmitter UE.

Clause 88. The non-transitory computer-readable medium of any of clauses 76 to 87, wherein the first sidelink reference signal comprises a synchronization signal block (SSB) or a sidelink synchronization signal.

Clause 89. A non-transitory computer-readable medium storing computer-executable instructions that, when executed by a transmitter user equipment (UE), cause the UE to: transmit, to a first receiver UE, a first sidelink reference signal over a first sidelink established with the first receiver UE; and receive a first sidelink timing adjust (TA) command from the first receiver UE based on the first sidelink reference signal, the first sidelink TA command requesting the transmitter UE to adjust a sidelink transmit time of the transmitter UE.

Clause 90. The non-transitory computer-readable medium of clause 89, further comprising computer-executable instructions that, when executed by the transmitter UE, cause the transmitter UE to: transmit, to a second receiver UE, a second sidelink reference signal over a second sidelink established with the second receiver UE; and receive a second sidelink TA command from the second receiver UE based on the second sidelink reference signal, the second sidelink TA command requesting the transmitter UE to adjust the sidelink transmit time of the transmitter UE.

Clause 91. The non-transitory computer-readable medium of clause 90, further comprising computer-executable instructions that, when executed by the transmitter UE, cause the transmitter UE to: determine the sidelink transmit time of the transmitter UE based on a weighted average of the first sidelink TA command and the second sidelink TA command.

Clause 92. The non-transitory computer-readable medium of clause 91, wherein: a weight of the first sidelink TA command for the weighted average is based on a priority field included in the first sidelink TA command, a signal strength of a sidelink reference signal received from the first receiver UE, a sidelink beam associated with the sidelink reference signal received from the first receiver UE, or any combination thereof, and a weight of the second sidelink TA command for the weighted average is based on a priority field included in the second sidelink TA command, a signal strength of a sidelink reference signal received from the second receiver UE, a sidelink beam associated with the sidelink reference signal received from the second receiver UE, or any combination thereof.

Clause 93. The non-transitory computer-readable medium of any of clauses 90 to 92, further comprising computer-executable instructions that, when executed by the transmitter UE, cause the transmitter UE to: determine the sidelink transmit time of the transmitter UE based on which of the first sidelink TA command and the second sidelink TA command has a higher priority.

Clause 94. The non-transitory computer-readable medium of clause 93, wherein: the first sidelink TA command includes a priority field indicating a priority of the first sidelink TA command, the second sidelink TA command includes a priority field indicating a priority of the second sidelink TA command, or any combination thereof.

Clause 95. The non-transitory computer-readable medium of any of clauses 89 to 94, wherein the first sidelink is frequency-division multiplexed with an uplink channel to a base station serving the transmitter UE.

Clause 96. The non-transitory computer-readable medium of clause 95, further comprising computer-executable instructions that, when executed by the transmitter UE, cause the transmitter UE to: receive, from the base station, an uplink TA command, wherein the uplink TA command has a higher priority than the first sidelink TA command.

Clause 97. The non-transitory computer-readable medium of clause 96, further comprising computer-executable instructions that, when executed by the transmitter UE, cause the transmitter UE to: ignore the first sidelink TA command based on reception of the uplink TA command.

Clause 98. The non-transitory computer-readable medium of any of clauses 89 to 97, wherein the first sidelink TA command is received in a medium access control control element (MAC-CE) or sidelink control information (SCI).

Clause 99. The non-transitory computer-readable medium of any of clauses 89 to 98, wherein the first sidelink TA command is received from a base station serving the transmitter UE.

Clause 100. The non-transitory computer-readable medium of any of clauses 89 to 99, wherein the first sidelink reference signal comprises a synchronization signal block (SSB) or a sidelink synchronization signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD- ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A receiver user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, from a first transmitter UE, a first sidelink reference signal over a first sidelink established with the first transmitter UE;
transmit, via the one or more transceivers, a first sidelink timing adjust (TA) command to the first transmitter UE based on the first sidelink reference signal, wherein the first sidelink TA command requests the first transmitter UE to adjust a sidelink transmit time of the first transmitter UE;
receive, via the one or more transceivers, from a second transmitter UE, a second sidelink reference signal over a second sidelink established with the second transmitter UE; and
transmit, via the one or more transceivers, a second sidelink TA command to the second transmitter UE based on the second sidelink reference signal, the second sidelink TA command requesting the second transmitter UE to adjust a sidelink transmit time of the second transmitter UE, wherein the second sidelink TA command includes a different transmit timing adjustment from the first sidelink TA command.

2. The receiver UE of claim 1, wherein the one or more processors, either alone or in combination, are further configured to:
determine a timing difference between the first sidelink reference signal and the second sidelink reference signal.

3. The receiver UE of claim 2, wherein the timing difference comprises a difference between a time of arrival (ToA) of the first sidelink reference signal and a ToA of the second sidelink reference signal.

4. The receiver UE of claim 2, wherein the timing difference is included in the first sidelink TA command as a requested timing adjustment for the sidelink transmit time of the first transmitter UE.

5. The receiver UE of claim 2, wherein:
a first portion of the timing difference is included in the first sidelink TA command as a requested timing adjustment for the sidelink transmit time of the first transmitter UE, and
a second portion of the timing difference is included in the second sidelink TA command as a requested timing adjustment for the sidelink transmit time of the second transmitter UE.

6. The receiver UE of claim 1, wherein the second sidelink TA command includes a priority field indicating a priority of the second sidelink TA command.

7. The receiver UE of claim 1, wherein the first sidelink TA command includes a priority field indicating a priority of the first sidelink TA command.

8. The receiver UE of claim 1, wherein the first sidelink and the second sidelink are frequency-division multiplexed.

9. The receiver UE of claim 1, wherein the first sidelink TA command is transmitted in a medium access control control element (MAC-CE) or sidelink control information (SCI).

10. The receiver UE of claim 1, wherein:
the first sidelink TA command is transmitted to a base station serving the receiver UE, and
the first sidelink TA command is forwarded by the base station serving the receiver UE to a base station serving the first transmitter UE.

11. The receiver UE of claim 1, wherein the first sidelink reference signal comprises a synchronization signal block (SSB) or a sidelink synchronization signal.

12. A transmitter user equipment (UE), comprising:
one or more memories;
one or more transceivers; and
one or more processors communicatively coupled to the one or more memories and the one or more transceivers, the one or more processors, either alone or in combination, configured to:

transmit, via the one or more transceivers, to a first receiver UE, a first sidelink reference signal over a first sidelink established with the first receiver UE;
receive, via the one or more transceivers, a first sidelink timing adjust (TA) command from the first receiver UE based on the first sidelink reference signal, wherein the first sidelink TA command requests the transmitter UE to adjust a sidelink transmit time of the transmitter UE;
transmit, via the one or more transceivers, to a second receiver UE, a second sidelink reference signal over a second sidelink established with the second receiver UE; and
receive, via the one or more transceivers, a second sidelink TA command from the second receiver UE based on the second sidelink reference signal, the second sidelink TA command requesting the transmitter UE to adjust the sidelink transmit time of the transmitter UE, wherein the second sidelink TA command includes a different transmit timing adjustment from the first sidelink TA command.

13. The transmitter UE of claim 12, wherein the one or more processors, either alone or in combination, are further configured to:
determine the sidelink transmit time of the transmitter UE based on a weighted average of the first sidelink TA command and the second sidelink TA command.

14. The transmitter UE of claim 13, wherein:
a weight of the first sidelink TA command for the weighted average is based on a priority field included in the first sidelink TA command, a signal strength of a sidelink reference signal received from the first receiver UE, a sidelink beam associated with the sidelink reference signal received from the first receiver UE, or any combination thereof, and
a weight of the second sidelink TA command for the weighted average is based on a priority field included in the second sidelink TA command, a signal strength of a sidelink reference signal received from the second receiver UE, a sidelink beam associated with the sidelink reference signal received from the second receiver UE, or any combination thereof.

15. The transmitter UE of claim 12, wherein the one or more processors, either alone or in combination, are further configured to:
determine the sidelink transmit time of the transmitter UE based on which of the first sidelink TA command and the second sidelink TA command has a higher priority.

16. The transmitter UE of claim 12, wherein:
the first sidelink TA command includes a priority field indicating a priority of the first sidelink TA command,
the second sidelink TA command includes a priority field indicating a priority of the second sidelink TA command,
or a combination thereof.

17. The transmitter UE of claim 12, wherein the first sidelink is frequency-division multiplexed with an uplink channel to a base station serving the transmitter UE.

18. The transmitter UE of claim 17, wherein the one or more processors, either alone or in combination, are further configured to:
receive, via the at least one transceiver, from the base station, an uplink TA command, wherein the uplink TA command has a higher priority than the first sidelink TA command.

19. The transmitter UE of claim 18, wherein the one or more processors, either alone or in combination, are further configured to:
ignore the first sidelink TA command based on reception of the uplink TA command.

20. The transmitter UE of claim 12, wherein the first sidelink TA command is received in a medium access control control element (MAC-CE) or sidelink control information (SCI).

21. The transmitter UE of claim 12, wherein the first sidelink TA command is received from a base station serving the transmitter UE.

22. The transmitter UE of claim 12, wherein the first sidelink reference signal comprises a synchronization signal block (SSB) or a sidelink synchronization signal.

23. A method for wireless communication performed by a receiver user equipment (UE), comprising:
receiving, from a first transmitter UE, a first sidelink reference signal over a first sidelink established with the first transmitter UE;
transmitting a first sidelink timing adjust (TA) command to the first transmitter UE based on the first sidelink reference signal, wherein the first sidelink TA command requests the first transmitter UE to adjust a sidelink transmit time of the first transmitter UE;
receiving, from a second transmitter UE, a second sidelink reference signal over a second sidelink established with the second transmitter UE; and
transmitting a second sidelink TA command to the second transmitter UE based on the second sidelink reference signal, the second sidelink TA command requesting the second transmitter UE to adjust a sidelink transmit time of the second transmitter UE, wherein the second sidelink TA command includes a different transmit timing adjustment from the first sidelink TA command.

24. The method of claim 23, wherein:
the first sidelink TA command includes a priority field indicating a priority of the first sidelink TA command,
the second sidelink TA command includes a priority field indicating a priority of the second sidelink TA command,
or a combination thereof.

25. A method for wireless communication performed by a transmitter user equipment (UE), comprising:
transmitting, to a first receiver UE, a first sidelink reference signal over a first sidelink established with the first receiver UE;
receiving a first sidelink timing adjust (TA) command from the first receiver UE based on the first sidelink reference signal, wherein the first sidelink TA command requests the transmitter UE to adjust a sidelink transmit time of the transmitter UE;
transmitting, to a second receiver UE, a second sidelink reference signal over a second sidelink established with the second receiver UE; and
receiving a second sidelink TA command from the second receiver UE based on the second sidelink reference signal, the second sidelink TA command requesting the transmitter UE to adjust the sidelink transmit time of the transmitter UE, wherein the second sidelink TA command includes a different transmit timing adjustment from the first sidelink TA command.

26. The method of claim 25, wherein;
the first sidelink TA command includes a priority field indicating a priority of the first sidelink TA command, the second sidelink TA command includes a priority field indicating a priority of the second sidelink TA command, or a combination thereof.

\* \* \* \* \*